United States Patent
Vermeulen et al.

(10) Patent No.: US 8,997,430 B1
(45) Date of Patent: Apr. 7, 2015

(54) FLOOR PANEL ASSEMBLY

(71) Applicant: Spanolux N.V.-Div. Balterio, Sint-Baafs-Vijve (BE)

(72) Inventors: Bruno Paul Louis Vermeulen, Aldeneik-Maaseik (BE); Jan Eddy De Rick, Geraardsbergen (BE)

(73) Assignee: Spanolux N.V.-Div. Balterio, Sint-Baafs-Vijve (BE)

( * ) Notice: Subject to any disclaimer, the term of this patent is extended or adjusted under 35 U.S.C. 154(b) by 0 days.

(21) Appl. No.: 14/591,448

(22) Filed: Jan. 7, 2015

Related U.S. Application Data

(63) Continuation of application No. 13/640,814, filed as application No. PCT/EP2010/054992 on Apr. 15, 2010.

(51) Int. Cl.
*E04B 2/00* (2006.01)
*E04F 15/02* (2006.01)

(52) U.S. Cl.
CPC ... *E04F 15/02033* (2013.01); *E04F 2201/0138* (2013.01); *E04F 2201/0153* (2013.01); *E04F 2201/0115* (2013.01); *E04F 15/02038* (2013.01); *E04F 15/02* (2013.01)

(58) Field of Classification Search
CPC ............... E04F 15/02038; E04F 15/02; E04F 2201/0115; E04F 2201/0138; E04F 2201/0153; E04F 2201/0176; E04F 2201/049; E04F 2201/0523; E04F 2201/0552; E04F 2201/0588
USPC .......... 52/309.1, 309.13, 582.1, 582.2, 586.1, 52/586.2, 588.1, 591.1, 592.1
See application file for complete search history.

(56) References Cited

U.S. PATENT DOCUMENTS

| 87,853 A | 3/1869 | Kappes |
| 108,068 A | 10/1870 | Utley |

(Continued)

FOREIGN PATENT DOCUMENTS

| BE | 557844 | 6/1957 |
| BE | 1018712 | 7/2011 |

(Continued)

OTHER PUBLICATIONS

"Balterio introduces the new fold down installation system PXP®." News[online]. Balterio Corporation, 2011 [retrieved on Nov. 7, 2013]. Retrieved from the Internet: <URL:http://www.balterio.com/gb/en/news/359>.

(Continued)

*Primary Examiner* — Jeanette E Chapman
*Assistant Examiner* — James Buckle, Jr.
(74) *Attorney, Agent, or Firm* — Ropes & Gray LLP

(57) ABSTRACT

A floor panel assembly includes adjacent floor panels connected together along edges thereof with a locking element extending between the edges. The locking element has a first locking surface; a locking portion at one end; a control portion near another end; and a connecting portion connecting the locking portion to the control portion. The connecting portion is slidably accommodated in a channel of one of the panels and pushed towards a first end of the channel when the locking element is moved or deformed from a first position to a second position by the control portion, the front position being when the panels are disconnected and movable relative to each other and the second position being when the panels are fixedly connected to each other.

15 Claims, 14 Drawing Sheets

(56) References Cited

U.S. PATENT DOCUMENTS

| | | | |
|---|---|---|---|
| 124,228 | A | 3/1872 | Stuart |
| 213,740 | A | 4/1879 | Conner |
| 274,354 | A | 3/1883 | McCarthy et al. |
| 316,176 | A | 4/1885 | Ransom |
| 634,581 | A | 10/1899 | Miller |
| 861,911 | A | 7/1907 | Stewart et al. |
| 1,194,636 | A | 8/1916 | Joy |
| 1,723,306 | A | 8/1929 | Sipe |
| 1,743,492 | A | 1/1930 | Sipe |
| 1,809,393 | A | 6/1931 | Rockwell |
| 1,902,716 | A | 3/1933 | Newton |
| 2,026,511 | A | 12/1935 | Storm |
| 2,204,675 | A | 6/1940 | Grunert |
| 2,277,758 | A | 3/1942 | Hawkins |
| 2,430,200 | A | 11/1947 | Wilson |
| 2,497,837 | A | 2/1950 | Nelson |
| 2,596,280 | A | 5/1952 | Nystrom |
| 2,732,706 | A | 1/1956 | Friedman |
| 2,740,167 | A | 4/1956 | Rowley |
| 2,863,185 | A | 12/1958 | Riedi |
| 2,865,058 | A | 12/1958 | Andersson et al. |
| 2,872,712 | A | 2/1959 | Brown et al. |
| 2,889,016 | A | 6/1959 | Warren |
| 3,023,681 | A | 3/1962 | Worson |
| 3,077,703 | A | 2/1963 | Bergstrom |
| 3,099,110 | A | 7/1963 | Spaight |
| 3,147,522 | A | 9/1964 | Schumm |
| 3,271,787 | A | 9/1966 | Clary |
| 3,325,585 | A | 6/1967 | Brenneman |
| 3,378,958 | A | 4/1968 | Parks et al. |
| 3,396,640 | A | 8/1968 | Fujihara |
| 3,512,324 | A | 5/1970 | Reed |
| 3,517,927 | A | 6/1970 | Kennel |
| 3,526,071 | A | 9/1970 | Watanabe |
| 3,535,844 | A | 10/1970 | Glaros |
| 3,572,224 | A | 3/1971 | Perry |
| 3,579,941 | A | 5/1971 | Tibbals |
| 3,720,027 | A | 3/1973 | Christensen |
| 3,722,379 | A | 3/1973 | Koester |
| 3,742,669 | A | 7/1973 | Mansfeld |
| 3,760,547 | A | 9/1973 | Brenneman |
| 3,760,548 | A | 9/1973 | Sauer et al. |
| 3,778,954 | A | 12/1973 | Meserole |
| 3,849,235 | A | 11/1974 | Gwynne |
| 3,919,820 | A | 11/1975 | Green |
| 3,950,915 | A | 4/1976 | Cole |
| 4,007,994 | A | 2/1977 | Brown |
| 4,030,852 | A | 6/1977 | Hein |
| 4,037,377 | A | 7/1977 | Howell et al. |
| 4,064,571 | A | 12/1977 | Phipps |
| 4,080,086 | A | 3/1978 | Watson |
| 4,082,129 | A | 4/1978 | Morelock |
| 4,100,710 | A | 7/1978 | Kowallik |
| 4,107,892 | A | 8/1978 | Bellem |
| 4,113,399 | A | 9/1978 | Hansen |
| 4,169,688 | A | 10/1979 | Toshio |
| 4,196,554 | A | 4/1980 | Anderson et al. |
| 4,227,430 | A | 10/1980 | Jansson et al. |
| 4,299,070 | A | 11/1981 | Oltmanns et al. |
| 4,304,083 | A | 12/1981 | Anderson |
| 4,426,820 | A | 1/1984 | Terbrack et al. |
| 4,447,172 | A | 5/1984 | Galbreath |
| 4,512,131 | A | 4/1985 | Laramore |
| 4,599,841 | A | 7/1986 | Haid |
| 4,648,165 | A | 3/1987 | Whitehorse |
| 5,007,222 | A | 4/1991 | Raymond |
| 5,071,282 | A | 12/1991 | Brown |
| 5,148,850 | A | 9/1992 | Urbanick |
| 5,173,012 | A | 12/1992 | Ortwein et al. |
| 5,182,892 | A | 2/1993 | Chase |
| 5,247,773 | A | 9/1993 | Weir |
| 5,272,850 | A | 12/1993 | Mysliwiec et al. |
| 5,344,700 | A | 9/1994 | McGath et al. |
| 5,348,778 | A | 9/1994 | Knipp et al. |
| 5,465,546 | A | 11/1995 | Buse |
| 5,485,702 | A | 1/1996 | Sholton |
| 5,502,939 | A | 4/1996 | Zadock et al. |
| 5,548,937 | A | 8/1996 | Shimonohara |
| 5,598,682 | A | 2/1997 | Haughian |
| 5,618,602 | A | 4/1997 | Nelson |
| 5,634,309 | A | 6/1997 | Polen |
| 5,658,086 | A | 8/1997 | Brokaw et al. |
| 5,671,575 | A | 9/1997 | Wu |
| 5,694,730 | A | 12/1997 | Del Rincon et al. |
| 5,755,068 | A | 5/1998 | Ormiston |
| 5,899,038 | A | 5/1999 | Stroppiana |
| 5,950,389 | A | 9/1999 | Porter |
| 5,970,675 | A | 10/1999 | Schray |
| 6,006,486 | A | 12/1999 | Moriau et al. |
| 6,029,416 | A | 2/2000 | Andersson |
| 6,052,960 | A | 4/2000 | Yonemura |
| 6,065,262 | A | 5/2000 | Motta |
| 6,173,548 | B1 | 1/2001 | Hamar et al. |
| 6,182,410 | B1 | 2/2001 | Pervan |
| 6,216,409 | B1 | 4/2001 | Roy et al. |
| 6,314,701 | B1 | 11/2001 | Meyerson |
| 6,363,677 | B1 | 4/2002 | Chen |
| 6,385,936 | B1 | 5/2002 | Schneider |
| 6,418,683 | B1 | 7/2002 | Martensson et al. |
| 6,446,413 | B1 | 9/2002 | Gruber |
| 6,449,918 | B1 | 9/2002 | Nelson |
| 6,490,836 | B1 | 12/2002 | Moriau et al. |
| 6,505,452 | B1 | 1/2003 | Hannig |
| 6,553,724 | B1 | 4/2003 | Bigler |
| 6,591,568 | B1 | 7/2003 | Palsson |
| 6,601,359 | B2 | 8/2003 | Olofsson |
| 6,617,009 | B1 | 9/2003 | Chen et al. |
| 6,647,689 | B2 | 11/2003 | Pletzer |
| 6,647,690 | B1 | 11/2003 | Martensson |
| 6,651,400 | B1 | 11/2003 | Murphy |
| 6,670,019 | B2 | 12/2003 | Andersson |
| 6,685,391 | B1 | 2/2004 | Gideon |
| 6,763,643 | B1 | 7/2004 | Martensson |
| 6,766,622 | B1 | 7/2004 | Thiers |
| 6,769,219 | B2 | 8/2004 | Schwitte et al. |
| 6,769,835 | B2 | 8/2004 | Stridsman |
| 6,804,926 | B1 | 10/2004 | Eisermann |
| 6,854,235 | B2 | 2/2005 | Martensson |
| 6,862,857 | B2 | 3/2005 | Tychsen |
| 6,865,855 | B2 | 3/2005 | Knauseder |
| 6,874,291 | B1 | 4/2005 | Weber |
| 6,880,307 | B2 | 4/2005 | Schwitte et al. |
| 6,948,716 | B2 | 9/2005 | Drouin |
| 7,021,019 | B2 | 4/2006 | Knauseder |
| 7,040,068 | B2 | 5/2006 | Moriau et al. |
| 7,051,486 | B2 | 5/2006 | Pervan |
| 7,065,935 | B2 | 6/2006 | Ralf |
| 7,108,031 | B1 | 9/2006 | Secrest |
| 7,121,058 | B2 | 10/2006 | Palsson |
| 7,137,229 | B2 | 11/2006 | Pervan |
| 7,152,383 | B1 | 12/2006 | Wilkinson et al. |
| 7,188,456 | B2 | 3/2007 | Knaudeser |
| 7,219,392 | B2 | 5/2007 | Mullet et al. |
| 7,251,916 | B2 | 8/2007 | Konzelmann et al. |
| 7,257,926 | B1 | 8/2007 | Kirby |
| 7,332,053 | B2 | 2/2008 | Palsson et al. |
| 7,337,588 | B1 | 3/2008 | Moebus |
| 7,377,081 | B2 | 5/2008 | Ruhdorfer |
| 7,451,578 | B2 | 11/2008 | Hannig |
| 7,454,875 | B2 | 11/2008 | Pervan et al. |
| 7,516,588 | B2 | 4/2009 | Pervan |
| 7,533,500 | B2 | 5/2009 | Morton et al. |
| 7,556,849 | B2 | 7/2009 | Thompson et al. |
| 7,568,322 | B2 | 8/2009 | Pervan |
| 7,584,583 | B2 | 9/2009 | Bergelin et al. |
| 7,603,826 | B1 | 10/2009 | Moebus |
| 7,614,197 | B2 | 11/2009 | Nelson |
| 7,617,651 | B2 | 11/2009 | Grafenauer |
| 7,621,092 | B2 | 11/2009 | Groeke et al. |
| 7,634,884 | B2 | 12/2009 | Pervan et al. |
| 7,637,068 | B2 | 12/2009 | Pervan |
| 7,654,055 | B2 | 2/2010 | Ricker |
| 7,677,005 | B2 | 3/2010 | Pervan |
| 7,716,889 | B2 | 5/2010 | Pervan |

(56) References Cited

U.S. PATENT DOCUMENTS

| | | |
|---|---|---|
| 7,721,503 B2 | 5/2010 | Pervan et al. |
| 7,726,088 B2 | 6/2010 | Muehlebach |
| 7,757,452 B2 | 7/2010 | Pervan |
| 7,802,411 B2 | 9/2010 | Pervan et al. |
| 7,806,624 B2 | 10/2010 | McLean et al. |
| 7,841,144 B2 | 11/2010 | Pervan |
| 7,841,145 B2 | 11/2010 | Pervan et al. |
| 7,861,482 B2 | 1/2011 | Pervan et al. |
| 7,866,110 B2 | 1/2011 | Pervan |
| 7,908,815 B2 | 3/2011 | Pervan et al. |
| 7,930,862 B2 | 4/2011 | Bergelin et al. |
| 7,980,039 B2 | 7/2011 | Groeke et al. |
| 7,980,041 B2 | 7/2011 | Pervan et al. |
| 8,033,704 B2 | 10/2011 | Krupa et al. |
| 8,042,311 B2 | 10/2011 | Pervan et al. |
| 8,061,104 B2 | 11/2011 | Pervan |
| 8,079,196 B2 | 12/2011 | Pervan |
| 8,112,967 B2 | 2/2012 | Pervan et al. |
| 8,171,692 B2 | 5/2012 | Pervan |
| 8,181,416 B2 | 5/2012 | Pervan et al. |
| 8,220,217 B2 | 7/2012 | Muehlebach |
| 8,234,830 B2 | 8/2012 | Pervan et al. |
| 8,302,367 B2 | 11/2012 | Schulte |
| 8,336,272 B2 | 12/2012 | Prager et al. |
| 8,341,914 B2 | 1/2013 | Pervan et al. |
| 8,341,915 B2 | 1/2013 | Pervan et al. |
| 8,353,140 B2 | 1/2013 | Prevan et al. |
| 8,359,805 B2 | 1/2013 | Pervan et al. |
| 8,381,477 B2 | 2/2013 | Pervan et al. |
| 8,387,327 B2 | 3/2013 | Pervan |
| 8,448,402 B2 | 5/2013 | Pervan et al. |
| 8,505,257 B2 | 8/2013 | Boo et al. |
| 8,572,922 B2 | 11/2013 | Pervan |
| 2001/0024707 A1 | 9/2001 | Andersson et al. |
| 2002/0031646 A1 | 3/2002 | Chen et al. |
| 2002/0046433 A1 | 4/2002 | Sellman et al. |
| 2002/0069611 A1 | 6/2002 | Leopolder |
| 2002/0100231 A1 | 8/2002 | Miller et al. |
| 2002/0170258 A1 | 11/2002 | Schwitte et al. |
| 2002/0170259 A1 | 11/2002 | Ferris |
| 2002/0178674 A1 | 12/2002 | Pervan |
| 2002/0178680 A1 | 12/2002 | Martensson et al. |
| 2003/0009971 A1 | 1/2003 | Palmberg |
| 2003/0024199 A1 | 2/2003 | Pervan et al. |
| 2003/0037504 A1 | 2/2003 | Schwitte et al. |
| 2003/0084636 A1 | 5/2003 | Pervan |
| 2003/0094230 A1 | 5/2003 | Sjoberg |
| 2003/0101681 A1 | 6/2003 | Tychsen |
| 2003/0154676 A1 | 8/2003 | Schwartz |
| 2003/0180091 A1 | 9/2003 | Stridsman |
| 2003/0188504 A1 | 10/2003 | Ralf |
| 2003/0196405 A1 | 10/2003 | Pervan |
| 2004/0031227 A1 | 2/2004 | Knauseder |
| 2004/0049999 A1 | 3/2004 | Krieger |
| 2004/0060255 A1 | 4/2004 | Knauseder |
| 2004/0068954 A1 | 4/2004 | Martensson |
| 2004/0107659 A1 | 6/2004 | Glockl |
| 2004/0123548 A1 | 7/2004 | Gimpel et al. |
| 2004/0128934 A1 | 7/2004 | Hecht |
| 2004/0139676 A1 | 7/2004 | Knauseder |
| 2004/0139678 A1 | 7/2004 | Pervan |
| 2004/0159066 A1 | 8/2004 | Thiers et al. |
| 2004/0168392 A1 | 9/2004 | Konzelmann et al. |
| 2004/0177584 A1 | 9/2004 | Pervan |
| 2004/0182033 A1 | 9/2004 | Wernersson |
| 2004/0182036 A1 | 9/2004 | Sjoberg et al. |
| 2004/0200175 A1 | 10/2004 | Weber |
| 2004/0211143 A1 | 10/2004 | Hanning |
| 2004/0250492 A1 | 12/2004 | Becker |
| 2004/0255541 A1 | 12/2004 | Thiers et al. |
| 2004/0261348 A1 | 12/2004 | Vulin |
| 2005/0028474 A1 | 2/2005 | Kim |
| 2005/0050827 A1 | 3/2005 | Schitter |
| 2005/0138881 A1 | 6/2005 | Pervan |
| 2005/0160694 A1 | 7/2005 | Pervan |
| 2005/0166514 A1 | 8/2005 | Pervan |
| 2005/0205161 A1 | 9/2005 | Lewark |
| 2005/0210810 A1 | 9/2005 | Pervan |
| 2005/0235593 A1 | 10/2005 | Hecht |
| 2006/0070333 A1 | 4/2006 | Pervan |
| 2006/0099386 A1 | 5/2006 | Smith |
| 2006/0101769 A1 | 5/2006 | Pervan et al. |
| 2006/0156670 A1 | 7/2006 | Knauseder |
| 2006/0236642 A1 | 10/2006 | Pervan |
| 2006/0260254 A1 | 11/2006 | Pervan |
| 2007/0006543 A1 | 1/2007 | Engstrom |
| 2007/0028547 A1 | 2/2007 | Grafenauer et al. |
| 2007/0065293 A1 | 3/2007 | Hannig |
| 2007/0108679 A1 | 5/2007 | Grothaus |
| 2007/0151189 A1 | 7/2007 | Yang |
| 2007/0175143 A1 | 8/2007 | Pervan et al. |
| 2007/0175156 A1 | 8/2007 | Pervan et al. |
| 2007/0193178 A1 | 8/2007 | Groeke et al. |
| 2007/0209736 A1 | 9/2007 | Deringor et al. |
| 2008/0000185 A1 | 1/2008 | Duernberger et al. |
| 2008/0005989 A1 | 1/2008 | Pervan et al. |
| 2008/0010931 A1 | 1/2008 | Pervan et al. |
| 2008/0028707 A1 | 2/2008 | Pervan |
| 2008/0034708 A1 | 2/2008 | Pervan |
| 2008/0041008 A1 | 2/2008 | Pervan |
| 2008/0066415 A1 | 3/2008 | Pervan et al. |
| 2008/0104921 A1 | 5/2008 | Pervan et al. |
| 2008/0110125 A1 | 5/2008 | Pervan |
| 2008/0134607 A1 | 6/2008 | Pervan et al. |
| 2008/0134613 A1 | 6/2008 | Pervan |
| 2008/0134614 A1 | 6/2008 | Pervan et al. |
| 2008/0155930 A1 | 7/2008 | Pervan et al. |
| 2008/0172971 A1 | 7/2008 | Pervan |
| 2008/0216434 A1 | 9/2008 | Pervan |
| 2008/0216920 A1 | 9/2008 | Pervan |
| 2008/0236088 A1 | 10/2008 | Hannig |
| 2008/0263975 A1 | 10/2008 | Mead |
| 2008/0295432 A1 | 12/2008 | Pervan et al. |
| 2009/0019806 A1 | 1/2009 | Muehlebach |
| 2009/0064624 A1 | 3/2009 | Sokol |
| 2009/0100782 A1 | 4/2009 | Groeke et al. |
| 2009/0133353 A1 | 5/2009 | Pervan et al. |
| 2009/0151290 A1 | 6/2009 | Liu |
| 2009/0155612 A1 | 6/2009 | Pervan et al. |
| 2009/0193748 A1 | 8/2009 | Boo et al. |
| 2009/0193753 A1 | 8/2009 | Schitter |
| 2009/0217615 A1 | 9/2009 | Engstrom |
| 2009/0308014 A1 | 12/2009 | Muehlebach |
| 2010/0043333 A1 | 2/2010 | Hannig |
| 2010/0083603 A1 | 4/2010 | Goodwin |
| 2010/0173122 A1 | 7/2010 | Susnjara |
| 2010/0281803 A1 | 11/2010 | Cappelle |
| 2010/0293879 A1 | 11/2010 | Pervan et al. |
| 2010/0300030 A1 | 12/2010 | Pervan et al. |
| 2010/0300031 A1 | 12/2010 | Pervan et al. |
| 2010/0319291 A1 | 12/2010 | Pervan et al. |
| 2011/0016815 A1 | 1/2011 | Yang |
| 2011/0030303 A1 | 2/2011 | Pervan et al. |
| 2011/0041996 A1 | 2/2011 | Pervan |
| 2011/0088344 A1 | 4/2011 | Pervan et al. |
| 2011/0088345 A1 | 4/2011 | Pervan |
| 2011/0131916 A1 | 6/2011 | Chen et al. |
| 2011/0154763 A1 | 6/2011 | Bergelin et al. |
| 2011/0167750 A1 | 7/2011 | Pervan |
| 2011/0167751 A1 | 7/2011 | Engstrom |
| 2011/0173914 A1 | 7/2011 | Engstrom |
| 2011/0197535 A1 | 8/2011 | Baker et al. |
| 2011/0225922 A1 | 9/2011 | Pervan et al. |
| 2011/0252733 A1 | 10/2011 | Pervan et al. |
| 2011/0271631 A1 | 11/2011 | Engstrom |
| 2011/0271632 A1 | 11/2011 | Cappelle et al. |
| 2011/0283650 A1 | 11/2011 | Pervan et al. |
| 2012/0011796 A1 | 1/2012 | Hannig |
| 2012/0017533 A1 | 1/2012 | Pervan et al. |
| 2012/0031029 A1 | 2/2012 | Pervan et al. |
| 2012/0036804 A1 | 2/2012 | Pervan |
| 2012/0055112 A1 | 3/2012 | Engstrom |
| 2012/0124932 A1 | 5/2012 | Schulte et al. |
| 2012/0151865 A1 | 6/2012 | Pervan et al. |

(56) References Cited

U.S. PATENT DOCUMENTS

| | | |
|---|---|---|
| 2012/0174515 A1 | 7/2012 | Pervan et al. |
| 2012/0174520 A1 | 7/2012 | Pervan |
| 2012/0192521 A1 | 8/2012 | Schulte |
| 2012/0279161 A1 | 11/2012 | Hakansson et al. |
| 2013/0008117 A1 | 1/2013 | Pervan |
| 2013/0008119 A1 | 1/2013 | Vermeulen et al. |
| 2013/0014463 A1 | 1/2013 | Pervan |
| 2013/0019555 A1 | 1/2013 | Pervan et al. |
| 2013/0042562 A1 | 2/2013 | Pervan et al. |
| 2013/0042563 A1 | 2/2013 | Pervan et al. |
| 2013/0042564 A1 | 2/2013 | Pervan et al. |
| 2013/0042565 A1 | 2/2013 | Pervan et al. |
| 2013/0047536 A1 | 2/2013 | Pervan |
| 2013/0055950 A1 | 3/2013 | Pervan et al. |
| 2013/0081349 A1 | 4/2013 | Pervan et al. |
| 2013/0111845 A1 | 5/2013 | Pervan et al. |
| 2013/0145708 A1 | 6/2013 | Pervan et al. |
| 2013/0239508 A1 | 9/2013 | Darko et al. |
| 2013/0263454 A1 | 10/2013 | Boo et al. |
| 2013/0263547 A1 | 10/2013 | Boo |

FOREIGN PATENT DOCUMENTS

| | | |
|---|---|---|
| CA | 2456513 | 2/2003 |
| CH | 562377 | 5/1975 |
| CN | 201588375 | 9/2010 |
| DE | 2502992 | 7/1976 |
| DE | 3046618 | 7/1982 |
| DE | 3932980 | 11/1991 |
| DE | 4344089 | 7/1994 |
| DE | 29614086 | 11/1996 |
| DE | 29911462 | 12/1999 |
| DE | 29922649 | 4/2000 |
| DE | 20000484 | 6/2000 |
| DE | 20008708 | 10/2000 |
| DE | 19940837 | 11/2000 |
| DE | 19929896 | 1/2001 |
| DE | 19933343 | 2/2001 |
| DE | 19958225 | 6/2001 |
| DE | 10001076 | 10/2001 |
| DE | 20206460 | 7/2002 |
| DE | 29924169 | 7/2002 |
| DE | 20205774 | 8/2002 |
| DE | 10224540 | 12/2003 |
| DE | 29924582 | 1/2004 |
| DE | 10237397 | 2/2004 |
| DE | 10252864 | 5/2004 |
| DE | 10253236 | 5/2004 |
| DE | 10305695 | 9/2004 |
| DE | 20320799 | 4/2005 |
| DE | 102004055951 | 7/2005 |
| DE | 102004001363 | 8/2005 |
| DE | 102005002297 | 8/2005 |
| DE | 102004015604 | 11/2005 |
| DE | 102004054368 | 5/2006 |
| DE | 102005024366 | 11/2006 |
| DE | 102006011887 | 7/2007 |
| DE | 102006024184 | 11/2007 |
| DE | 102006037614 | 12/2007 |
| DE | 102006057491 | 6/2008 |
| DE | 102007019786 | 6/2008 |
| DE | 102007018309 | 8/2008 |
| DE | 102007020271 | 8/2008 |
| DE | 102007015907 | 10/2008 |
| DE | 102007017087 | 10/2008 |
| DE | 102007032885 | 1/2009 |
| DE | 102007035648 | 1/2009 |
| DE | 202009004530 | 1/2009 |
| DE | 102007049792 | 2/2009 |
| DE | 102008018410 | 11/2009 |
| DE | 102008021970 | 11/2009 |
| DE | 202004021628 | 12/2009 |
| DE | 102009048050 | 1/2011 |
| DE | 102010012572 | 7/2011 |
| DE | 202012007012 | 9/2012 |
| EP | 0013852 | 8/1980 |
| EP | 0085196 | 1/1982 |
| EP | 0715037 | 11/1995 |
| EP | 0871156 | 10/1998 |
| EP | 1119671 | 9/1999 |
| EP | 1304427 | 9/1999 |
| EP | 1394336 | 9/1999 |
| EP | 0974713 | 1/2000 |
| EP | 1722042 | 1/2001 |
| EP | 1120515 | 8/2001 |
| EP | 1159497 | 12/2001 |
| EP | 1190149 | 3/2002 |
| EP | 1200690 | 5/2002 |
| EP | 1279778 | 7/2002 |
| EP | 1669512 | 7/2002 |
| EP | 1953309 | 7/2002 |
| EP | 1246981 | 10/2002 |
| EP | 1276941 | 1/2003 |
| EP | 1282752 | 2/2003 |
| EP | 1420125 | 3/2003 |
| EP | 1350904 | 4/2003 |
| EP | 1359266 | 4/2003 |
| EP | 1308577 | 5/2003 |
| EP | 1367194 | 5/2003 |
| EP | 1380710 | 6/2003 |
| EP | 1357239 | 10/2003 |
| EP | 1415056 | 5/2004 |
| EP | 1650375 | 10/2004 |
| EP | 1559523 | 1/2005 |
| EP | 1582653 | 3/2005 |
| EP | 1802827 | 7/2005 |
| EP | 2281972 | 10/2005 |
| EP | 1674223 | 12/2005 |
| EP | 1923184 | 12/2005 |
| EP | 1640530 | 3/2006 |
| EP | 2305919 | 7/2006 |
| EP | 2395179 | 7/2006 |
| EP | 1437457 | 7/2007 |
| EP | 1929103 | 6/2008 |
| EP | 1936068 | 6/2008 |
| EP | 2034106 | 9/2008 |
| EP | 1980683 | 10/2008 |
| EP | 1987212 | 11/2008 |
| EP | 2009195 | 12/2008 |
| EP | 2017403 | 1/2009 |
| EP | 2049749 | 4/2009 |
| EP | 2270291 | 6/2009 |
| EP | 2236694 | 10/2010 |
| EP | 2520737 | 5/2011 |
| EP | 2570564 | 3/2013 |
| FR | 1138595 | 6/1957 |
| FR | 1522094 | 4/1968 |
| FR | 2256807 | 8/1975 |
| FR | 2278876 | 2/1976 |
| FR | 2810060 | 12/2001 |
| GB | 240629 | 10/1925 |
| GB | 376352 | 7/1932 |
| GB | 1171337 | 11/1969 |
| GB | 2051916 | 1/1981 |
| JP | 03110258 | 5/1991 |
| JP | 05018028 | 1/1993 |
| JP | 6288017 | 10/1994 |
| JP | 6306961 | 11/1994 |
| JP | 6322848 | 11/1994 |
| JP | 9426999 | 11/1994 |
| JP | 7300979 | 11/1995 |
| JP | 8086080 | 4/1996 |
| WF | WO0063510 | 10/2000 |
| WO | WO9426999 | 11/1994 |
| WO | WO9747834 | 12/1997 |
| WO | WO9822677 | 5/1998 |
| WO | WO0020705 | 4/2000 |
| WO | WO0020706 | 4/2000 |
| WO | WO0043281 | 7/2000 |
| WO | WO0047841 | 8/2000 |
| WO | WO0055067 | 9/2000 |
| WO | WO0102669 | 1/2001 |
| WO | WO0102670 | 1/2001 |

(56) References Cited

FOREIGN PATENT DOCUMENTS

| WO | WO0102672 | 7/2001 |
|---|---|---|
| WO | WO0148332 | 7/2001 |
| WO | WO0151732 | 7/2001 |
| WO | WO0151733 | 7/2001 |
| WO | WO0166877 | 9/2001 |
| WO | WO0175247 | 10/2001 |
| WO | WO0177461 | 10/2001 |
| WO | WO0188306 | 11/2001 |
| WO | WO0198604 | 12/2001 |
| WO | WO0248127 | 6/2002 |
| WO | WO03012224 | 2/2003 |
| WO | WO03016654 | 2/2003 |
| WO | WO03025307 | 3/2003 |
| WO | WO03074814 | 9/2003 |
| WO | WO03078761 | 9/2003 |
| WO | WO03083234 | 10/2003 |
| WO | WO03087497 | 10/2003 |
| WO | WO03089736 | 10/2003 |
| WO | WO2004016876 | 2/2004 |
| WO | WO2004016877 | 2/2004 |
| WO | WO2004020764 | 3/2004 |
| WO | WO2004053257 | 6/2004 |
| WO | WO2004079130 | 9/2004 |
| WO | WO2004083557 | 9/2004 |
| WO | WO2004085765 | 10/2004 |
| WO | WO2005003488 | 1/2005 |
| WO | WO2005003489 | 1/2005 |
| WO | WO2005054599 | 6/2005 |
| WO | WO2005068746 | 7/2005 |
| WO | WO2006043893 | 4/2006 |
| WO | WO2006050928 | 5/2006 |
| WO | WO2006104436 | 10/2006 |
| WO | WO2006123988 | 11/2006 |
| WO | WO2006125306 | 11/2006 |
| WO | WO2006133690 | 12/2006 |
| WO | WO2007008139 | 1/2007 |
| WO | WO2007015669 | 2/2007 |
| WO | WO2007020088 | 2/2007 |
| WO | WO2007053983 | 5/2007 |
| WO | WO2007079845 | 7/2007 |
| WO | WO2007089186 | 8/2007 |
| WO | WO2007141605 | 12/2007 |
| WO | WO2007142589 | 12/2007 |
| WO | WO2008004960 | 1/2008 |
| WO | WO2008017281 | 2/2008 |
| WO | WO2008017301 | 2/2008 |
| WO | WO2008060232 | 5/2008 |
| WO | WO2008068245 | 6/2008 |
| WO | WO2008083662 | 7/2008 |
| WO | WO2008110112 | 9/2008 |
| WO | WO2008116623 | 10/2008 |
| WO | WO2008122479 | 10/2008 |
| WO | WO2009021487 | 2/2009 |
| WO | WO2009033623 | 3/2009 |
| WO | WO2009061279 | 5/2009 |
| WO | WO2009077178 | 6/2009 |
| WO | WO2009116926 | 9/2009 |
| WO | WO2010001262 | 1/2010 |
| WO | WO2010017453 | 2/2010 |
| WO | WO2010070472 | 6/2010 |
| WO | WO2010070605 | 6/2010 |
| WO | WO2010081532 | 7/2010 |
| WO | WO2010082171 | 7/2010 |
| WO | WO2010086084 | 8/2010 |
| WO | WO2010087752 | 8/2010 |
| WO | WO2010108980 | 9/2010 |
| WO | WO2010136171 | 12/2010 |
| WO | WO2011001326 | 1/2011 |
| WO | WO2011012104 | 2/2011 |
| WO | WO2011012105 | 2/2011 |
| WO | WO2011032540 | 3/2011 |
| WO | WO2011038709 | 4/2011 |
| WO | WO2011061659 | 5/2011 |
| WO | WO2011085788 | 7/2011 |
| WO | WO2011087425 | 7/2011 |
| WO | WO2011108812 | 9/2011 |
| WO | WO2011127981 | 10/2011 |
| WO | WO2011151758 | 12/2011 |
| WO | WO2011157752 | 12/2011 |

OTHER PUBLICATIONS (Human) English-language translation of paragraphs 211-214 of Reply by Spanolux N.V. Divisie Balerio, Välinge Flooring Technology AB gegen Spanolux N.V. Divisie Balterio, Bird & Bird LLP, Düsseldorf, DE.

Cancellation Request by Spanolux N.V. Divisie Balterio, Inhaberin: Välinge Flooring Technology AB, Antragstellerin: Spanolux N.V. Divisie Baterio, Oct. 31, 2013, 75 pages, Bird & Bird LLP, Düsseldorf, DE. (With Human translation).

Complaint by Välinge Flooring Technology AB, Välinge Flooring Technology AB gegen Spanolux N.V. Divisie Balterio, Jan. 7, 2013, 144 pages, Grünecker Patent—und Rechtsanwalte, Munchen, DE (with machine translation of Complaint; and with Attachments ("Anlage").

Correspondence from German Patent and Trademark Office to GrOnecker, Kinkeldey, Stockmair & Schanhausse forwarding cancellation request, Nov. 11, 2013, 2 pages (With Human Translation).

Court Order, Verfügung im Rechtsstreit Välinge Flooring Gegen Spanolux N.V., Jan. 9, 2013, 2 pages, Landgericht Mannheim, Mannheim, DE. (With Human Translation).

Engstrand, Ola (Contact) Välinge Innovation AB, Technical Disclosure entitled "VA043 5G Linear Slide Tongue," IP.com No. IPCOM000179015D, Feb. 4, 2009, IP.com Prior Art Database, 126 pages.

Engstrand, Ola (Contact) Välinge Innovation AB, Technical Disclosure entitled "VA043b PCT Mechanical Locking of Floor Panels," IP.com No. 1PCOM000189420D, Nov. 9, 2009, IP.com Prior Art Database, 62 pages.

Engstrand, Ola (Contact) Välinge Innovation AB, Technical Disclosure entitled "VA055 Mechanical locking system for floor panels," 1P com No. IPCOM000206454D, Apr. 27, 2011, Room Prior Art Database, 25 pages.

Engstrand, Ola (Contact) Välinge Innovation AB, Technical Disclosure entitled "VA058 Rocker Tongue," IP.com No. IPCOM000203832D, Feb. 4, 2011, IP.com Prior Art Database, 22 pages.

Engstrand, Ola (Contact)/Välinge Innovation AB, Technical Disclosure entitled "VA038 Mechanical Locking of Floor Panels With Vertical Folding," IP.com No. IPCOM000179246D, Feb. 10, 2009, IP.com Prior Art Database, 59 pages.

European Search Report and the Written Opinion of the European Patent Office Patent Office in counterpart foreign application PCT/EP2010/054992 filed Apr. 15, 2010.

European Search Report and the Written Opinion of the European Patent Office Patent Office in counterpart foreign application PCT/EP2010/054993 filed Apr. 15, 2010.

European Search Report and the Written Opinion of the European Patent Office Patent Office in counterpart foreign application PCT/EP2010/054993 filed Oct. 1, 2011.

Grounds of Opposition to Cancellation Request by Välinge Flooring Technology AB dated Feb. 11, 2014 (Cancellation Proceedings for DE202012007012.6) (English Translation).

International Search Report mailed Oct. 15, 2012 in PCT/SE2012/050828, Swedish Patent Office, Stockholm, Sweden, 7 pages.

Pervan, Darko (Author) Välinge Flooring Technology, Technical Disclosure entitled "VA068 Press Lock VFT," IP.com No. IPCOM000208854D, Jul. 20, 2011, IP.com Prior Art Database, 25 pages.

Pervan, Darko (Author), Technical Disclosure entitled "V069 Combi Tongue," IP corn No. IPCOM00210866D, Sep. 13, 2011, IP.com Prior Art Database, 41 pages.

Pervan, Darko (Author), Technical Disclosure entitled "VA070 Strip Part," IP corn No. IPCOM000210867D, Sep. 13, 2011, IP.com Prior Art Database, 43 pages.

Pervan, Darko (Author), Technical Disclosure entitled "VA071 Pull Lock," IP com No. IPCOM000210868D, Sep. 13, 2011, IP.com Prior Art Database, 22 pages.

(56) References Cited

OTHER PUBLICATIONS

Pervan, Darko (Author), Technical Disclosure entitled "VA073a Zip Loc," IP com No. IPCOM000210869D, Sep. 13, 2011, IP.com Prior Art Database, 36 pages.

Pervan, Darko (Author)Välinge Flooring Technology AB, Technical Disclosure entitled "VA066b Glued Tongue," IP com No. IPCOM000210865D, Sep. 13, 2011, 1P.com Prior Art Database, 19 pages.

Pervan, Darko (Inventor) Välinge Flooring Technology AB, Technical Disclosure entitled "VA067 Fold Slide Loc," IP com No. IPCOM000208542D, Jul. 12, 2011, IP.com Prior Art Database, 37 pages.

Related U.S. Appl. No. 13/548,420, Office Action dated Sep. 5, 2013.

Reply by Spanolux N.V. Divisie Baited, Välinge Flooring Technology AB gegen Spanolux N.V. Divisie Balterio, Sep. 17, 2013, 832 pages, Bird & Bird LLP, Dusseldorf, DE (with machine translation of Reply; and with Attachments) ("Analage").

Reply by Spanolux N.V. Divisie Balterio, Välinge Flooring Technology AB gegen Spanolux N.V. Divisie Balterio, Mar. 12, 2013, 669 pages, Bird & Bird LLP, Dusseldorf, DE (with machine translation of Reply; and with Attachments).

Reply by Välinge Flooring Technology AB dated Sep. 1, 2014 (Cancellation Proceedings for DE202012007012.6) (German document and Machine Translation).

Reply by Välinge Flooring Technology AB, Välinge Flooring Technology AB gegen Spanolux N.V. Divisie Balerio, Sep. 23, 2013, 41 pages, Grünecker Patent—und Rechtsanwalte, Munchen, DE (with machine translation of Reply).

Reply by Välinge Flooring Technology AB, Välinge Flooring Technology AB gegen Spanolux N.V. Divisie Balerio, Jul. 3, 2013, 107 pages, Grünecker Patent—and Rechtsanwalte, Munchen, DE (with machine translation of Reply; and with Attachments) ("Analage").

Response to the Grounds of Opposition by Spanolux N.V.—Div. Balterio dated Jun. 24, 2014 (Cancellation Proceedings for DE202012007012.6) (English Translation).

Spanolux N.V.—Div. Balterio, Priority Document for EP 11007573, Sep. 16, 2011, 20 pages, European Patent Office.

Valinge Innovation AB, Technical Disclosure entitled "Mechanical locking for floor panels with a flexible bristle tongue," 1P.com No. IPCOM000145262D, Jan. 12, 2007, IP.com PriorArtDatabase, 57 pages.

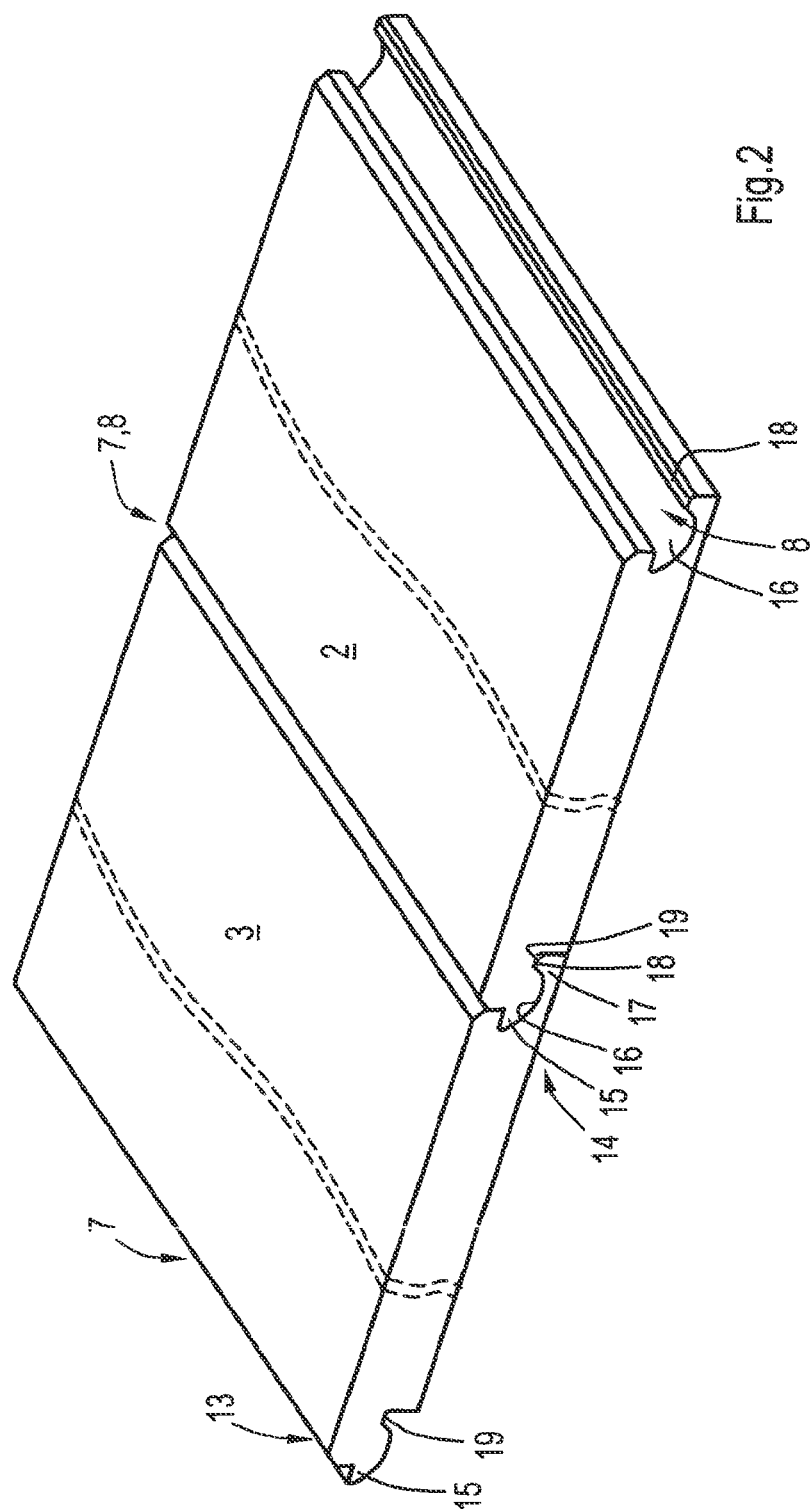

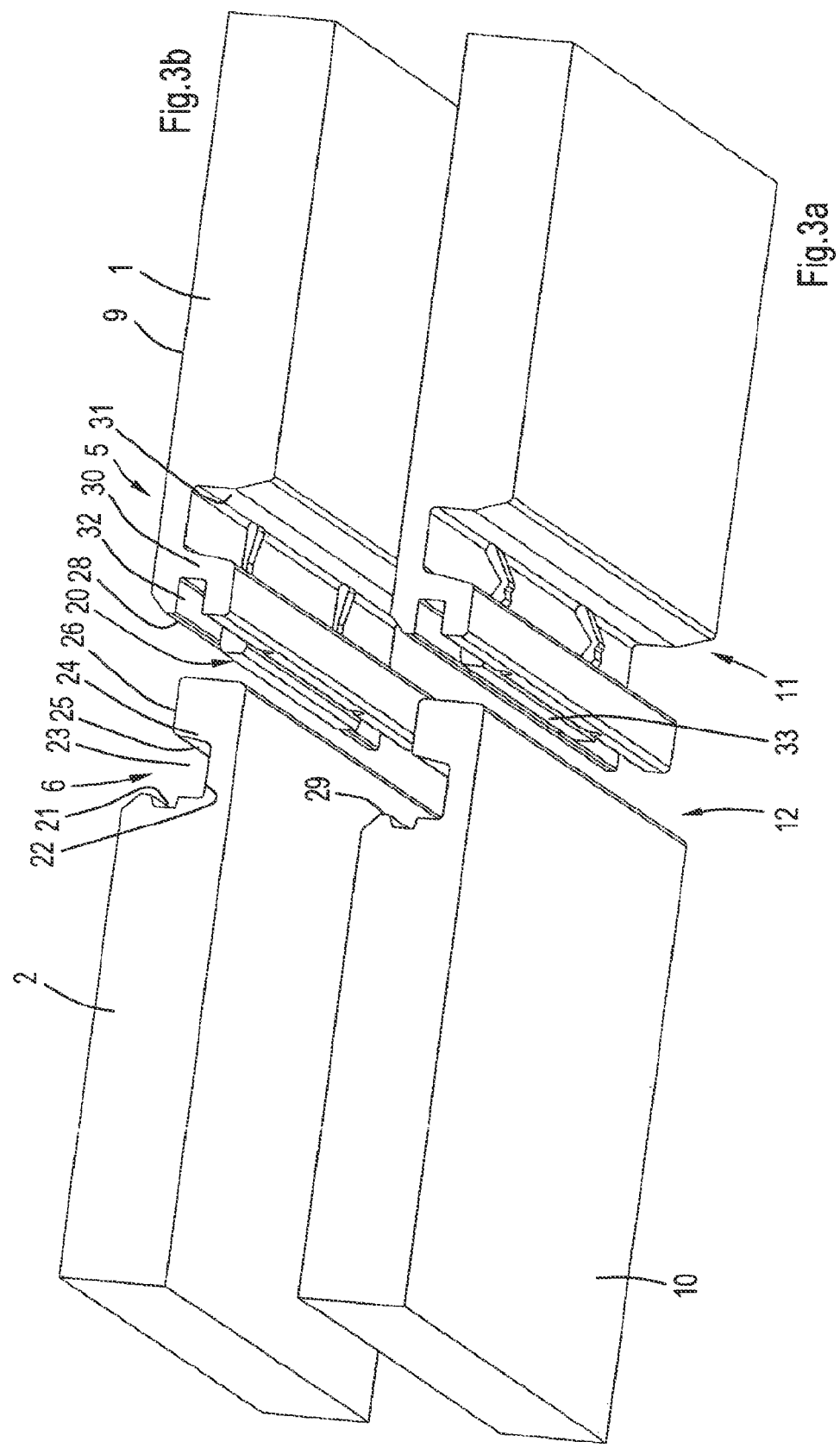

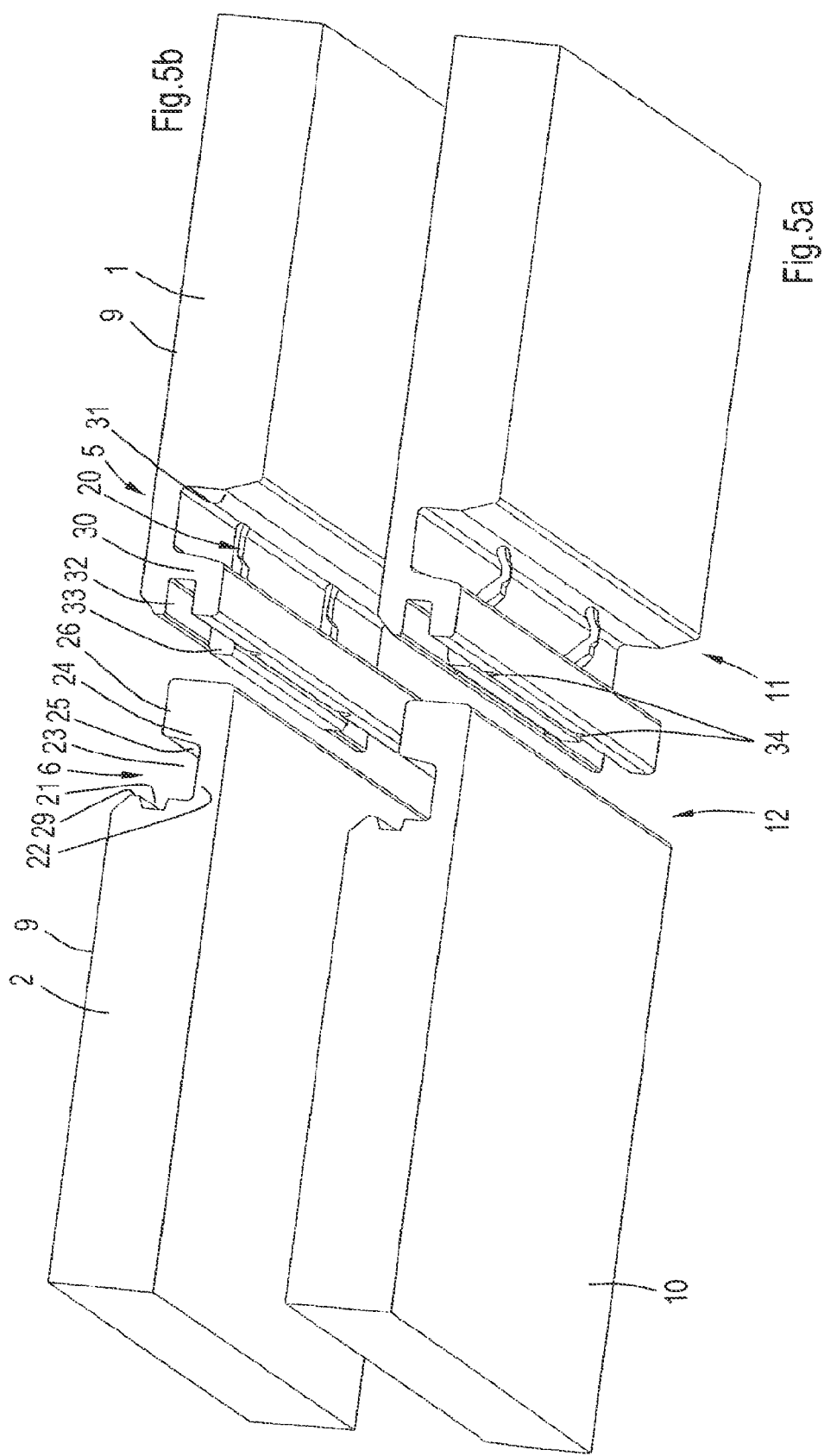

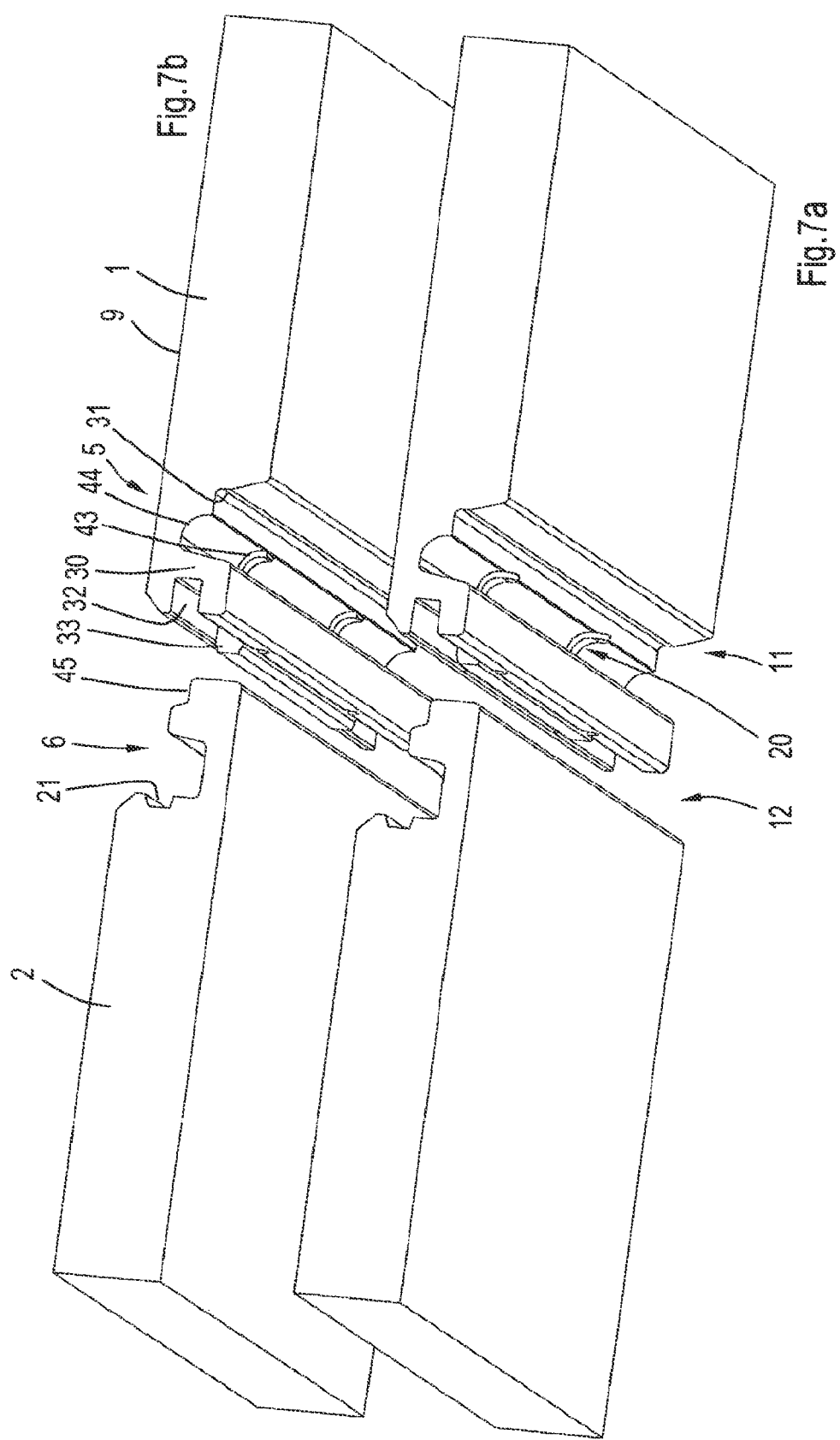

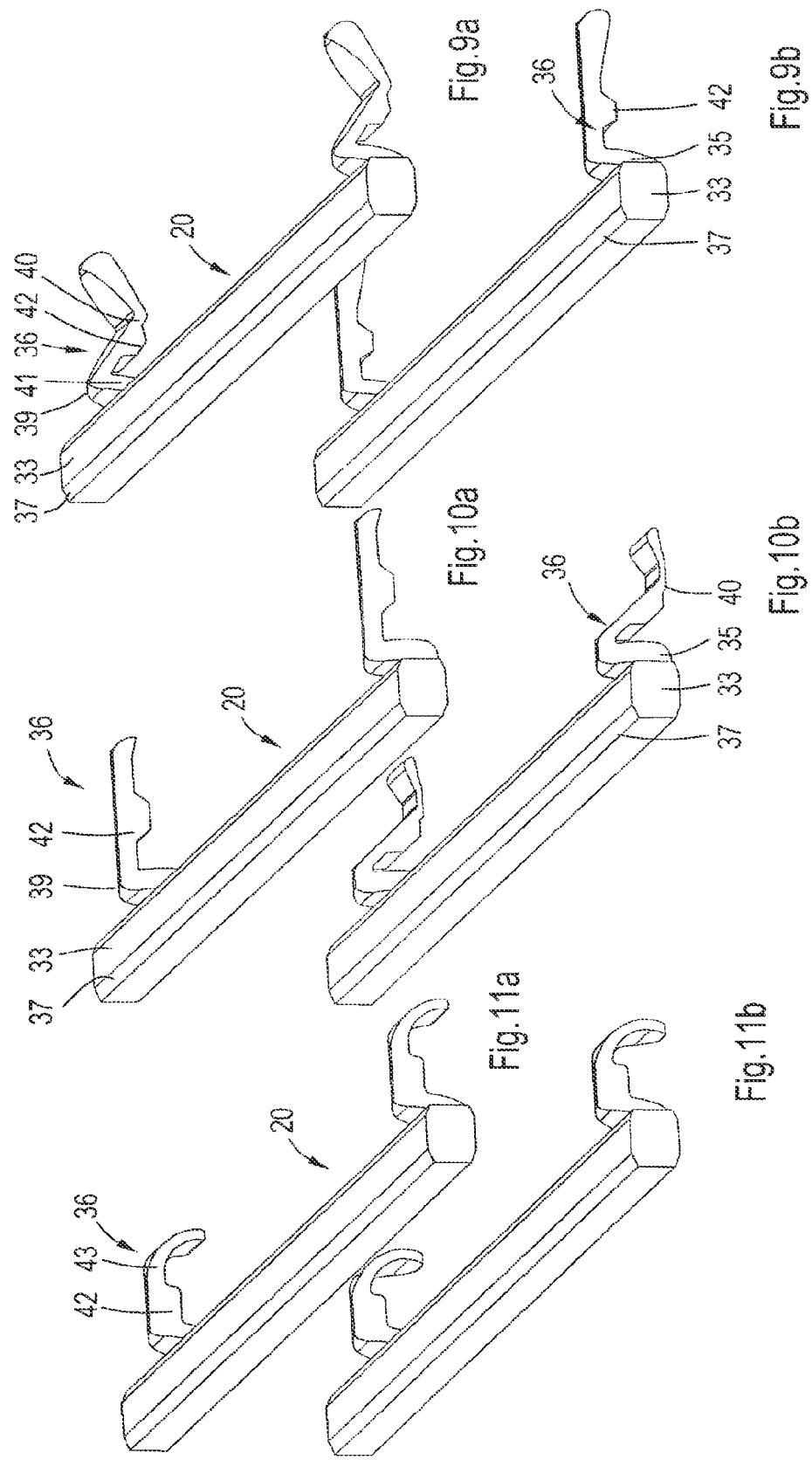

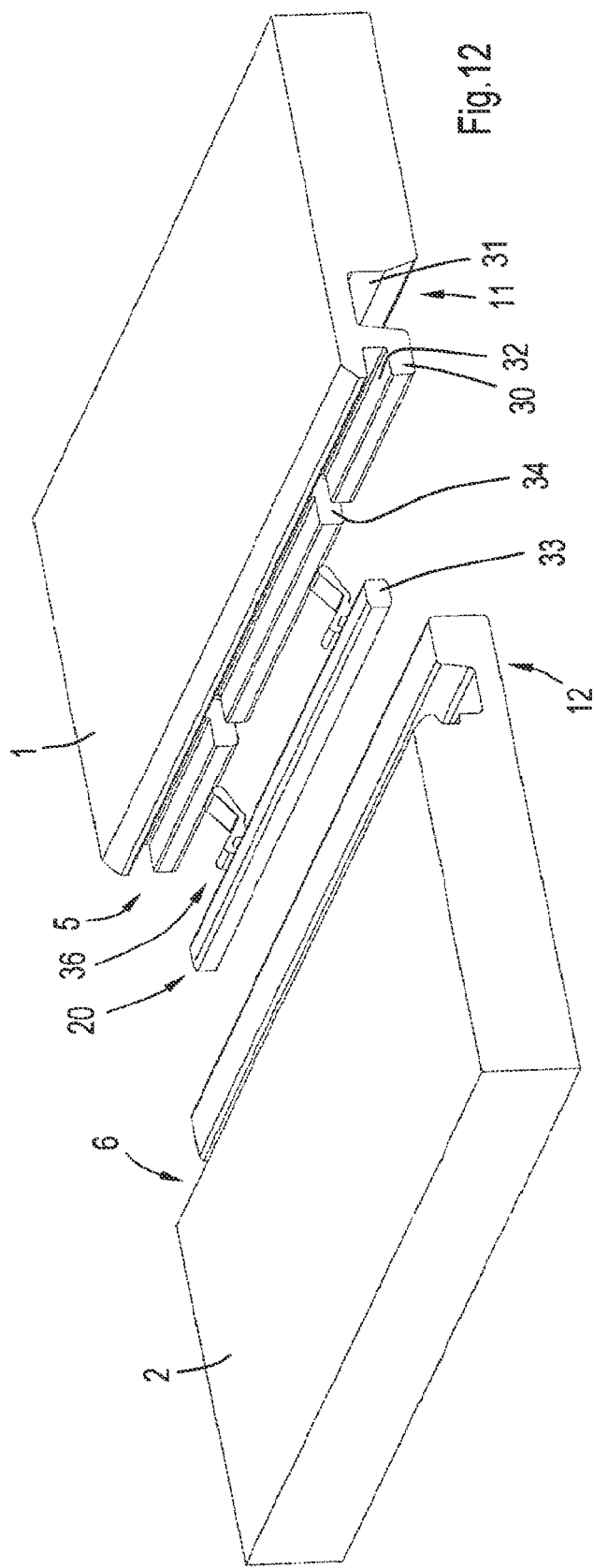

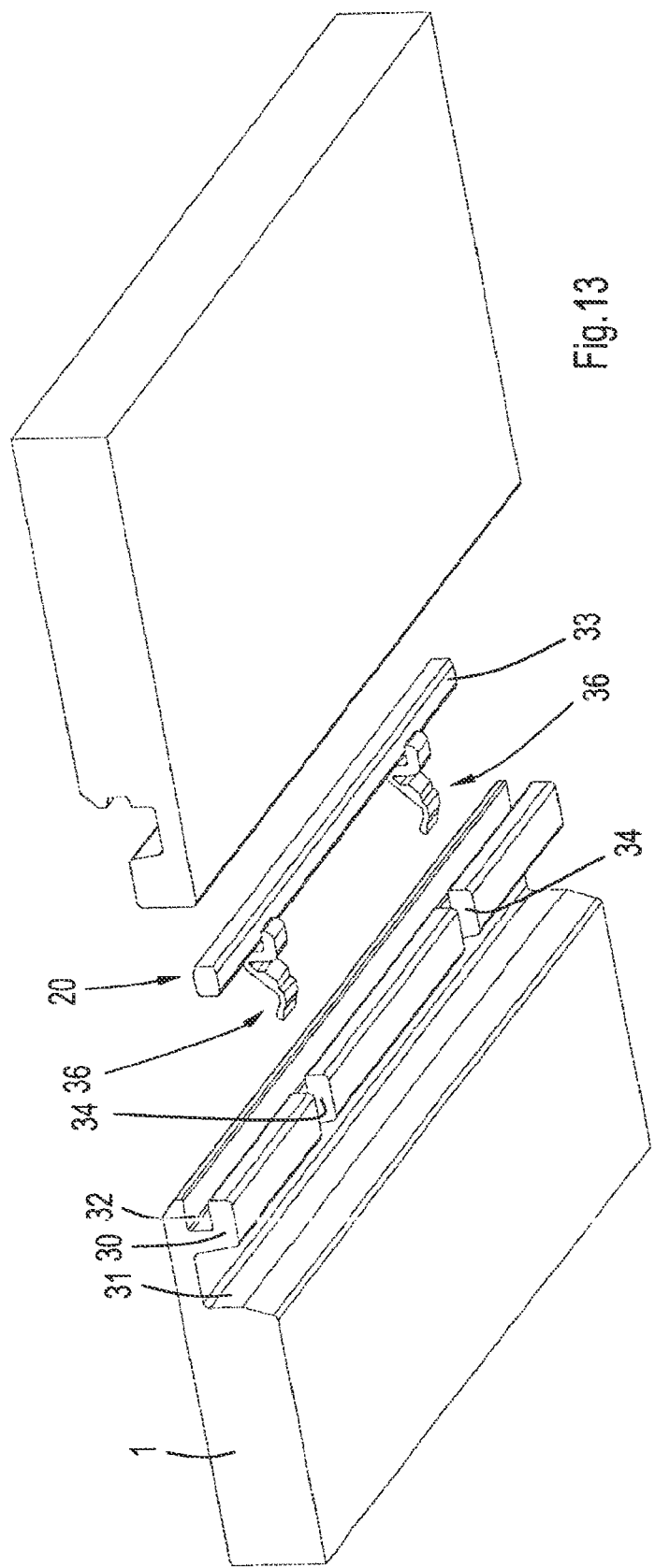

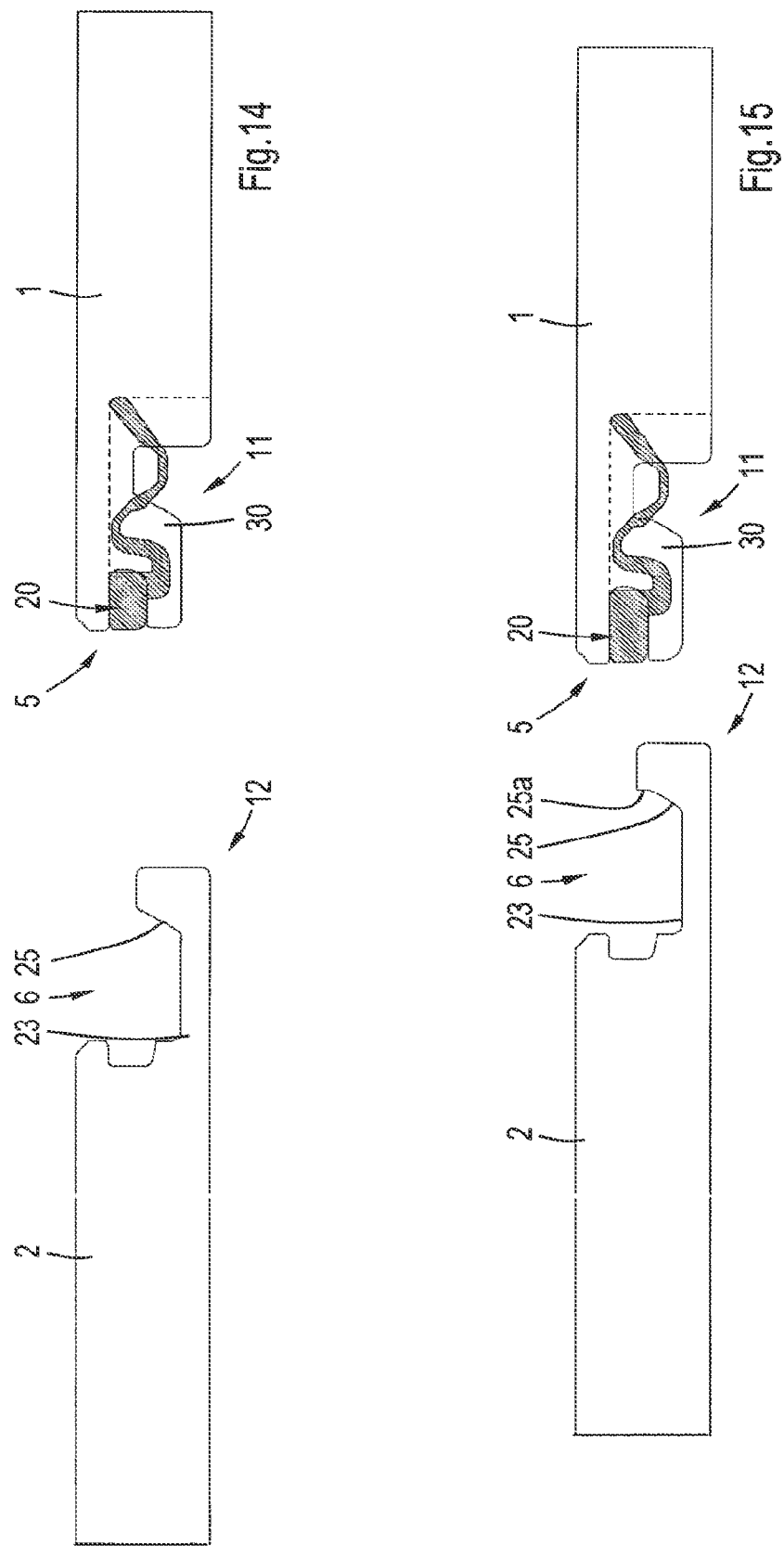

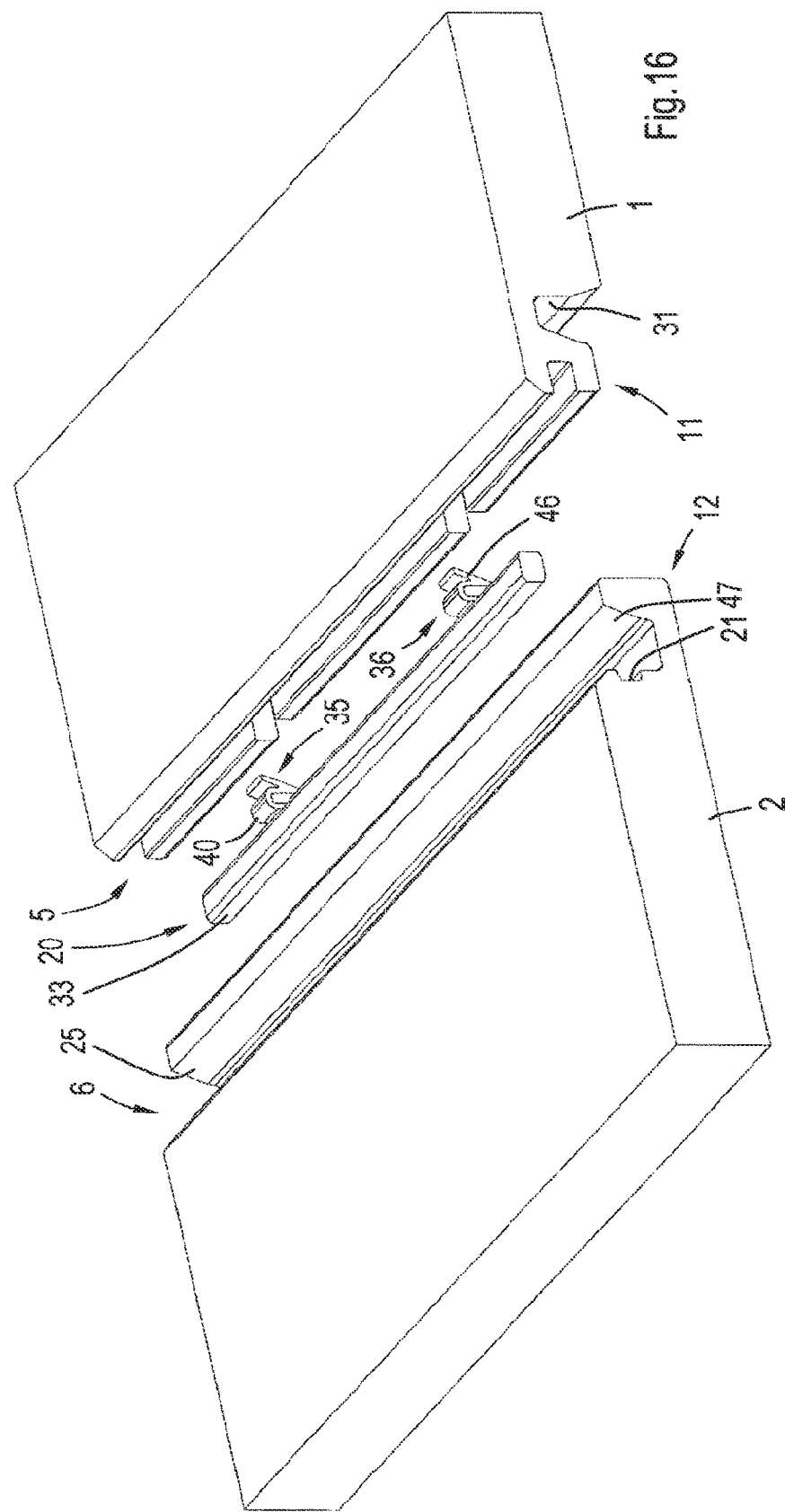

FLOOR PANEL ASSEMBLY

CROSS-REFERENCE TO RELATED APPLICATIONS

This application is a continuation of U.S. patent application No. 13/640.814, filed Oct. 12, 2012, as the Section 371 National Stage Application of International Application PCT/EP2010/054992 filed Apr. 15, 2010 and published as WO/2011/127981 A1 in English, each of which is hereby incorporated herein by reference in its entirety.

BACKGROUND

The discussion below is merely provided for general background information and is not intended to be used as an aid in determining the scope of the claimed subject matter.

Aspects of the invention relate to a floor panel assembly comprising sheet-shaped floor panels, which floor panels are provided with edges, as lower side and an upper side. The floor panels are intended to be joined by means of joining members. Particularly, each floor panel is provided on at least a first edge with a first joining member and, on an opposite second edge, with a second joining member. The first and second joining members are adapted to be joined by a movement of two panels with their first and second panel edges towards to each other such that in the joined position the panels meet each other near their upper side along a seam. The first and second joining members locking the panels at the adjacent edges at least in a direction perpendicular to the upper side and in a direction parallel to the upper side but perpendicular to the adjacent first and second edges in their joined position. The first and second joining members are provided with at least one locking element which is deformable and/or movable, during said joining, from a first position allowing the first and second joining members to be joined, to a second position in which it locks the first and second joining members to each other. The locking element is provided on one of the first and second joining members and comprises a first locking surface adapted to co-operate with a second locking surface on the other of said first and second joining members.

Floor panel assemblies having joining members comprising a deformable locking element are already known, for example from US 2009/0064624 A1.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

An aspect of the invention is a locking element that has a locking portion on one end bearing said first locking surface and a control portion near the other end as well as a connecting portion between them. The connecting portion is slidably accommodated in a channel having two open ends, and is pushed at least partly out of a first end of the channel when the locking element is moved and/or deformed from the first to the second position by means of the control portion extending from an opposite end of the channel for co-operation with the other of said first and second joining members.

In this manner, the locking element is guided in a reliable manner and has a control portion on one side of the channel and the locking surface on the other. The channel may be formed by a hole, groove, slit or the like.

The control portion may take the form of a flexible portion of the locking element extending along a curved guide such that the end of the locking element is at an angle to the locking portion and has at least a component perpendicular to the upper side of the respective panel, but as an alternative it is also possible that the control portion of the locking element is curved in the first position of the locking element in which the locking portion of the locking element is inactive and is moved to a more straight shape in the second position of the locking element under control of the relative movement of the panel edges.

In both embodiments, the movement of the panel edges causes the locking element to move from the first to the second position thereby bringing the locking surfaces in engagement with each other.

In the last embodiment, the control portion of the locking element may include at least one and preferably a plurality of pivots allowing the control portion to move between the curved and the more straight shape. This is a good manner to control the deformation of the control portion of the locking element.

An end of the control portion remote from the locking portion may substantially be fixed, so that the deformation takes place between the end of the control portion and the channel.

Alternatively, an end of the control portion is movable and is guided by a wall of the joining member during movement of the control portion from the curved to the more straight shape. In this way the movement of the end of the control portion will mainly control the movement of the locking element.

In a further alternative, the control portion of the locking element has a control surface that is inclined with respect to the direction of movement of the locking portion and with respect to the direction of movement of the panel edges, such that it can co-operate with a control surface of the other of said first and second joining members to move the locking portion of the locking element from the first to the second position. All kinds of other shapes and guiding ways can be used to cause the movement of the locking element.

In a particular embodiment, the first and second joining members are configured as a male and female joining member, the locking element being attached to the male joining member, although it is also conceivable to attach the locking element to the female joining member. If the edges of the panels are moved with respect to each other in a vertical sense, the female joining member will normally be on the lower edge and the male joining member will be on the upper edge.

In a further development, the male joining member is provided with a protrusion extending away from the upper side of the panel, the channel extending through said protrusion, particularly substantially parallel to the upper side or the respective panel.

The female joining member may then comprise a control portion for cooperation with the control portion of the locking element to move the locking element when the panel edges move towards each other.

Also, the female joining member may comprise a lip protruding substantially parallel to and from the lower side of the panel at the first edge, said lip having a depression to accommodate the protrusion of the male joining member, said depression having an upright projection near the free end of the lip forming the control portion of the female joining member.

The locking portion of the locking element may extend a part of the length of the respective panel edge and may be accommodated in a groove extending preferably along the length of the panel edge, the locking element being further provided with a plurality of connection and control portions accommodated in a plurality of channels.

In this manner, the groove can easily be made, for example by grinding the whole edge of the panel, while the locking portion may be of a shorter length allowing easy engagement of the locking surfaces, also if the panel edges are not moved towards each other in a parallel fashion.

It is very convenient if the connecting portion includes a spring-like part to absorb the movement of the control portion and to transfer it to the locking portion as soon as the first and second locking surfaces are allowed to engage.

This enables the control portion of the locking element, to be actuated before the locking surfaces can enter into engagement with each other. The movement of the panel edges is accumulated as spring energy which is release at a desired time. As a result it is not required to allow the locking surfaces to engage gradually in synchronization with the movement of the panel edges, although this is also encompassed by the invention. The locking surfaces may now engage instantaneous under influence of the spring force on the locking portion.

Nonetheless, the first and second locking surfaces may be inclined to facilitate their engagement.

An aspect of the invention also includes a floor panel for use in the above-described floor panel assembly, as well as a locking element for use in such floor panel.

BRIEF DESCRIPTION OF THE DRAWINGS

Further details and advantages of aspects of the invention follow from the below description of the invention with reference to the drawings showing embodiments of the invention by way of example only.

FIG. 2 is an enlarged cross sectional view according to the line II-II in FIG. 1 showing partly two panels with their third and fourth edges on the long sides of the panels.

FIGS. 3a and 3b show in perspective view a part of two separate panel edges having joining members including a locking element, wherein the locking element is illustrated in a first position (FIG. 3a) and in a second locked position (FIG. 3b).

FIGS. 5a and 5b are views corresponding to those of FIGS. 3a, 3b but showing a second embodiment of the invention.

FIGS. 7a and 7b are views corresponding to those of FIGS. 3a, 3b but showing a third embodiment of the invention.

FIGS. 9a, 9b, 10a, 10b and 11a, 11b, respectively, are enlarged perspective views of the separate locking element from the three embodiments of FIGS. 3/4, 5/6 and 7/8 in their first and second positions.

FIGS. 12 and 13 are perspective views from below and above, respectively, showing a variation of the embodiment of the invention according to FIGS. 3 and 4.

FIG. 14 and 15 are views mainly corresponding to that of FIG. 4a and showing variations of the first embodiment.

FIG. 16 is a view corresponding to that of FIG. 12 and FIGS. 17a, 17b and 17c are views corresponding to those of FIGS. 4a-4c showing a further embodiment of the invention.

DETAILED DESCRIPTION OF THE ILLUSTRATIVE EMBODIMENTS

Figure 1:
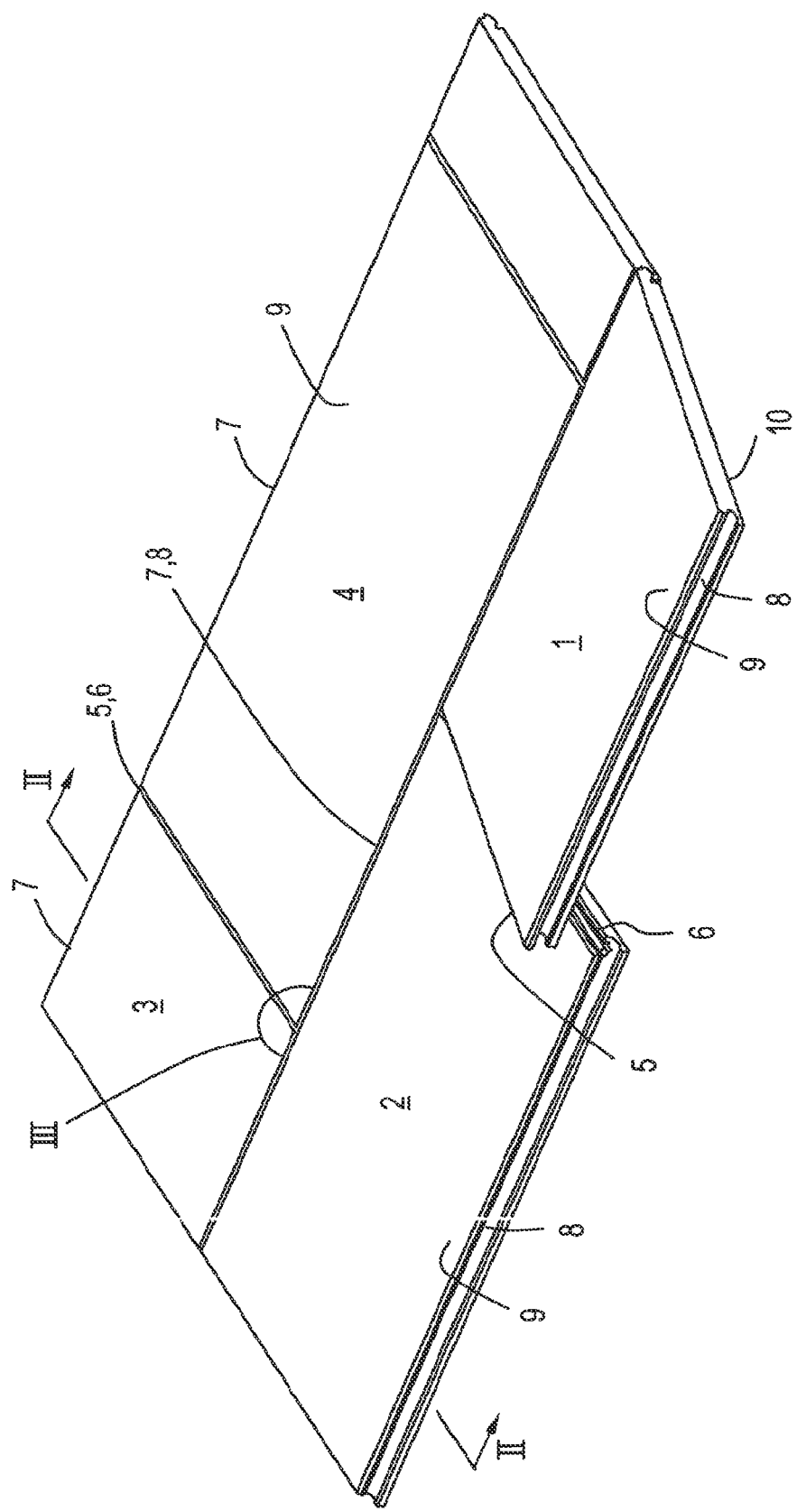
FIG. 1 is a perspective view of a plurality of panels of a panel assembly in a stage of laying the panels.

The drawings and in first instance FIG. 1 and 2 thereof, show a number of panels of an embodiment of the panel assembly. In particular, FIG. 1 shows a first panel 1, a second panel 2, a third panel 3 and a fourth panel 4. These panels are substantially rectangular and may both be square or elongated. The four panels shown are elongated having a first edge 5 and an opposite second edge 6 that are the short edges, and a third edge 7 and an opposite fourth edge 8 that form the long edges.

In principle the panel assembly is intended to form a floor covering, but the panels may also be used as wall panels, ceiling panels or panels for covering other surfaces. These surfaces may be indoor or outdoor surfaces.

In a particular embodiment, the panels may be constructed as laminate panels for forming a laminate flooring which is well known in the art. These panels are used to imitate planks or tiles of natural material, such as wood, stone or any other material. Generally these laminate panels comprise a core of relatively cheap material, in particular a wood based material such as material including wood particles or fibres such as MDF/HDF, a wood plastic composite (WPC), other composites including plastics, or plastics. The core of these panels may be covered by a decorative layer formed for example from transfer foil or a laminate of paper layers immersed with resin. The decor may also be formed in a different way, for example by printing directly and/or digitally on the core, or by finishing the core by embossing, chafing or the like. An upper surface 9 on the upper side of the panels is formed thereby. A lower surface 10 on the lower side of the panels may be formed by another layer, for example a water-proof coating or sheet. However, the invention is also applicable for panels made of wood, plastic or other material with or without separate upper and/or lower layers.

The edges 5-8 of each panel 1-4 are provided with joining members to join the panels to each other to obtain a floor covering in which the panels are coupled to each other substantially without the formation of a gap. For this purpose, the first edge 5 of each panel is provided with a first or male vertical joining member 11, the second edge 6 with a second or female vertical joining member 12, whereas the third edge 7 is provided with a first or male horizontal joining member 13 and the fourth edge 8 with a second or female horizontal joining member 14.

The third and fourth edges 7, 8 with the first and second joining members 13, 14 are shown in FIG. 2 and may be configured in a well known manner. These joining members 13, 14 are such that they allow a joining of the third and fourth edges 7, 8 of two panels by bringing the male joining member 13 in contact with the female joining member 14 of a panel or of two panels which are already installed on the surface. In FIG. 1, panel 1 is brought in engagement with panels 3 and 4. The first male joining member 13 is brought in engagement with the second female joining member 14 while the panel 1 is held in a relatively inclined position, where after panel 1 with the male joining member 13 is rotated with respect to the other panels 3 and 4 so as to bring the upper surfaces 9 of the panels substantially in alignment with each other. This method is also known as the "angling in" joining method. In principle it would also be possible to angle in a female joining member onto a male joining member of a panel already installed.

In the embodiment shown in FIG. 2 the joining members comprise locking element(s) which prevent the panels from drifting apart in a direction parallel to their surfaces 9, 10 and perpendicularly to their edges 7, 8. These locking element(s) are configured such that they exert a force urging the panels towards each other (i.e. perpendicular to their edges) while the panels are in their joined condition. This force counteracts the formation of gaps between the panels, in particular at the position near the upper surface 9 where the panels meet each other. This position may be exactly at the upper surface in the situation of Fig. 4, but in case the upper edges of the panels are machined for example to form a V-groove (see FIGS.), U-groove or other lowered area between the panels, the panel edges will meet at a distance from the upper surface 9.

FIG. 2 also shows that the first male joining member 13 includes locking portion herein a tongue 15, while the second female joining member 14 includes a groove 16 which is able to receive at least a portion of the tongue 15 therein so as to lock the panels with respect to each ether in a direction perpendicularly to surfaces 9, 10, i.e. in a vertical direction. The shape of the tongue and groove 15, 16 may have all kinds of configurations and orientations as long as they include surfaces that restrict movements in a direction perpendicularly to the surfaces 9, 10.

The horizontal lock of the panels away from each other is accomplished by means of a lip 17 below the groove 16 projecting from the panel 2 and carrying near its free edge an upper protrusion 18 engaging into a lower groove 19 positioned behind the tongue 15 of the panel 3.

Figure 4A:
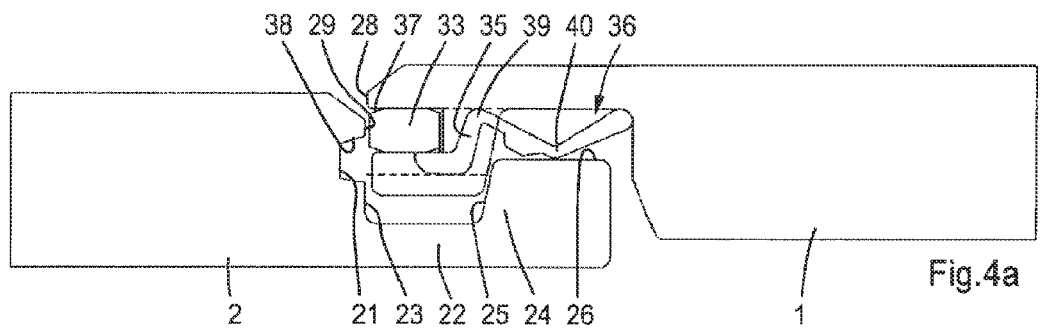
FIGS. 4a, 4b, 4c are side views of the panel edges of FIG. 3, in three different stages of locking the joining members of these panel edges.

It is shown in the drawings that the first joining member 11 of the first panel 1 is provided with a separate locking element 20 which is connected to the first joining member 11, and has sufficient freedom of movement to move or deform in order to cooperate with the second joining member 11 in order to couple the joining members 11, 12 to each other such that it locks the first and second joining members 11, 12 to each other in both a direction perpendicular to the upper surface 9 and in a direction parallel to the upper surface 9 but perpendicular to the adjacent first and second edges 5, 6 in their joined position. For this purpose, the locking element 20 is deformable from a first position, allowing first and second joining members 11, 12 to be joined (FIG. 3a and 4a), to a second position in which it locks the first and second joining members 11, 12 to each other (Figs. 3b and 4c).

In the embodiment shown, the locking element 20-when viewed in a direction parallel to the respective edge 5-is provided with a locking portion 33 on one of its ends, a control portion 36 on its other end and with a connecting portion 35 in between. The locking element 20, and in particular the locking portion 33 thereof, may extend along the whole length of the first, edge 5, but preferably there are provided a plurality of short locking elements 20 distributed along the length of the edge 5, or even only one short locking element 20 substantially in the middle of the second edge 6. The length and placement of the locking element 20 depends on various factors, in particular the length of the edges 5, 6, the material of the panels and the particular use of the panel assembly. The use of one or more narrow locking elements 20 facilitate a connection between two panel edges when the edges are moved towards each other in a non-parallel orientation, for example, if one panel is folded down as is disclosed here. Also the locking effect is better when there is a high local load because if one locking element is disengaged due to the high local load, the other locking elements will remain locked and keep the edges together.

The second or female joining member 12 comprises a groove 21 extending at a distance below the upper side of the panel 2 and parallel to the respective panel edge 6. The panel portion below the groove 21 is extended into a protruding lip 22 including in its upper surface a depression 23 adjacent to groove 21. In the embodiment shown, the depression 23 has a flat bottom parallel to the edge 6. On its free end the lip is provided with an upper projection 24 having an upright wall 25 bordering the depression 23 and an upper surface 26. On the free end of the lip 22 remains a free space 27 to the first edge 5 of the other panel in order to ensure that the seam between vertical wail surfaces 28, 29 near the upper surface 9 of the panels 1, 2 can be closed.

The first or male vertical joining member 11 comprises a downward protrusion 30 having in this case a substantially flat lower surface extending parallel to the first edge 5. The shape and dimension of this downward protrusion 30 is such that it will fit into the depression 23 of the female joining member 12 when the first and second joining members 11 and 12 are in their coupled condition. The lower surface of the protrusion 30 forms the lowest point of the first joining member 11 where the distance from the upper surface 9 of the panel is at a maximum. On the lower side of the first edge 5 is a recess 31 which is sufficiently large to take up the upward projection 24 on the lip 22 of the female joining member 12 and allow it to activate and lock the locking element 20 at. the first joining member 11 in the coupled condition of the joining members 11, 12.

The protrusion 30 has on its side adjacent the vertical wall surface 28 and at a distance from the lower surface of the protrusion 30 a groove 32 preferably extending the whole length of the edge 5 and adapted to slidingly accommodate a locking portion 33 ox the locking element 20. Furthermore, the protrusion 30 comprises at least one, here two channels 34 extending substantially perpendicularly to the groove 32 and connecting the groove 32 with the recess 31 of the first joining member 11. The channels 34, which are here formed as holes with two open ends, are adapted to guide a connecting portion 35 of each locking element 20 which can thus transfer a movement of a control portion 36 of the locking element 20 to the locking portion 33 thereof. The height of the channel 34 may be greater than that of the groove 32 so that the channel 34 also extends in the portion of the protrusion 30 below the groove 32, having there the form of an upwardly open groove.

As Is clearly shown in FIGS. 3, 4 and 9, the locking portion 33 of the locking element 20 is here in the form of a tongue 33. The tongue 33 is sized to be fully accommodated in the groove 32 in the first joining member 11 when it is in its first position, and to engage into the groove 21 of the second joining member 12 when it is in its second, locking position. For this locking function the tongue 33 is provided on its upper surface with a locking surface 37 co-operating with a locking surface 38 at the upper wall of the groove 21 in the second joining member 12. The locking surfaces 37 and 38 are inclined with respect to the upper surface 9 and the vertical wall surface 29. The angle may vary with respect to the upper surface 9 of the panel, but generally the locking surfaces 37 and 38 will be parallel to each other when engaged. The inclination of the locking surfaces allow them to gradually engage when the joining members 11, 12 are being coupled to each other.

The action of the control portion 36 in this embodiment of the locking element 20 is based on the principle that the control portion 36 is curved in the first position of the locking element 20 in which the tongue 33 of the locking element is inactive and is moved to a more straight shape in the second position of the locking element 20 under control of the relative movement of the panel edges 5, 6. In this embodiment the control portion 36 has for this purpose two hinges 39 and 40 parallel to the first edge 5 of the respective panel 1 and enabling the control portion 36 of the locking element 20 to deform. The hinge 39 is positioned on one end of the control portion adjacent the connecting portion 35, while the hinge 40 is positioned between the hinge 39 and the free end of the control portion 36. The hinges 39 and 40 are film hinges formed in one piece with the locking element 20 and may have a diminished thickness with respect to the adjacent portions of the locking element 20 or may have other characteristics allowing an elastic/plastic deformation of the control portion at the position of the hinges 39, 40.

A further feature of the locking element 20 is that the connecting portion 35 includes a spring 41 to absorb the movement of the control portion 36 and to transfer it to the tongue 33 as soon as the first and second locking surfaces 39, 40 are allowed to engage. This will be explained hereunder.

The operation of the joining members 11, 12 is illustrated with reference to FIGS. 4a-4c. The function of the locking element 20 is described with reference to one control and connecting portion 36, 35, but it should be kept in mind that this embodiment has two control and connecting portions 36, 35, while even a larger number is conceivable.

When panel 1 is in the position according to FIG. 1, edge 5 and therefore joining member 11 of first panel 1 comes gradually in engagement with edge 6 and joining member 12 of panel 2. In one cross section, the panels 1, 2 may be in the relative position according to FIG. 4a. The locking element 20 is in its first position with the tongue 33 of the locking portion within the groove 32 and the control portion 36 maximally curved. The hinge 40 of the control portion 36 is at a distance from the overlying portion of the first joining member 11, i.e. the top of the recess 31. This enables a deformation of the control portion 36 of the locking element 20. The upper surface 26 of the projection 24 on the lip 22 of the second joining member already contacts the control portion 36 at the hinge 40. The edge 5 is (at this cross section) moved downwardly to such an extent that the tongue 33 is positioned opposite the vertical surface 29 of the second joining member 12 and is thus prevented from moving out of the groove 32.

Figure 4B:
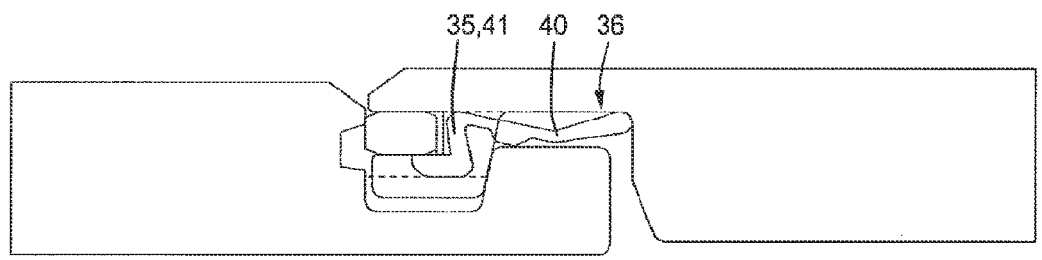
Figure 4C:
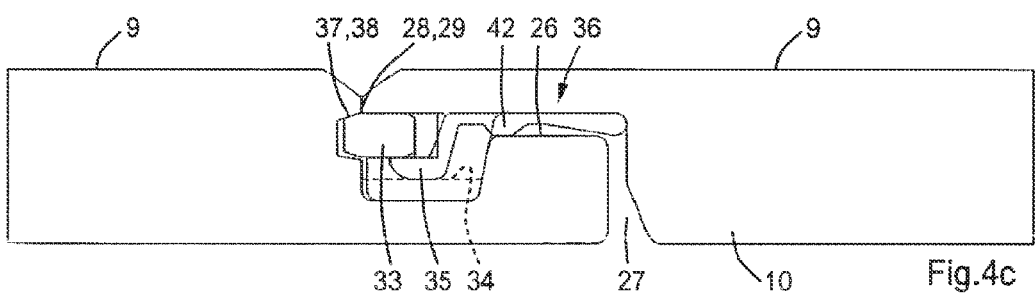

In FIG. 4b, the edge 5 is moved further downwardly, such that the upper surface 26 of the projection 24 on the lip 22 acts as a control portion of the second joining member 12 and has moved the hinge 40 of the control portion 36 of the locking element 20 towards the top of the recess 31. The triangle formed by the hinges 39, 40 and the free end of the control portion 36 has become flatter and as a result, the distance between the free end of the control portion 36 and the hinge 39 has become larger. Because the free end of the control portion 36 is fixed against the upright wall of the recess 31, the hinge 39 has moved towards the groove 32. Normally the hinge 39 would also have moved the tongue 33 in the same direction, but because the tongue 33 is still partly at the level of the vertical surface 29 of the second joining member 12, the tongue 33 cannot be displaced further until it engages the vertical surface 29. The movement of the hinge 39 is absorbed by the connecting portion 35 of the locking element which acts as a spring 41 which is now loaded by the displacement of the hinge 39.

In FIG. 4c, the edge 5 of panel 1 has moved into the position in which the upper surfaces 9 of both panels 1 and 2 are flush. The tongue 33 has been moved downwardly such that it is aligned with the groove 21 in the second joining member 12 and thus it is free to move out of the groove 32 in the first joining member 11 and partly into the groove 21 under influence of the spring force in the connecting portion 35 of the locking element 20. The inclination of the locking surfaces 37, 38 cause a gradual engagement and also compensates for tolerances, as does the springing connecting portion 35. In the locked second position of the locking element 20, the upper surface 26 of the upward projection 24 of the second joining member 12 is in engagement with a thickened part 42 of the control portion 36, and the control portion 36 is fully stretched, so that the distance between the free end of the control portion 36 and the hinge 39 is at a maximum. The substantially vertical wall surface of the protrusion 30 of the first joining member 11 and the upright wall 25 of the projection 24 of the second joining member 12 are also in engagement and prevent a horizontal movement of the panel edges 5, 6 away from each other, and the vertical surfaces 28, 29 may be urged into engagement with each other to prevent the formation of gaps between the panel edges 5, 6. As is clear, there is a movement substantially in one direction only when the tongue 33 of the locking element 20 moves from the first to the second position.

In the second position of the locking element 20, the locking surface 37 on the tongue 33 locks the first joining member 11 or the first panel 1 in the vertical direction.

This lock will be stronger if more force is needed to disengage the locking surfaces 37 and 38 again. This can be obtained for example if the friction between the locking surfaces 37 and 38 is large and if there is any residual spring force in the connecting portion 35 of the locking element 20. On the other hand, the inclination of the locking surfaces 37, 38 may allow the tongue 33 to be pushed back into its groove 32 if sufficient vertical force is exerted on the panel edge 5, so that the panels 1, 2 can be disassembled.

Figure 6A:
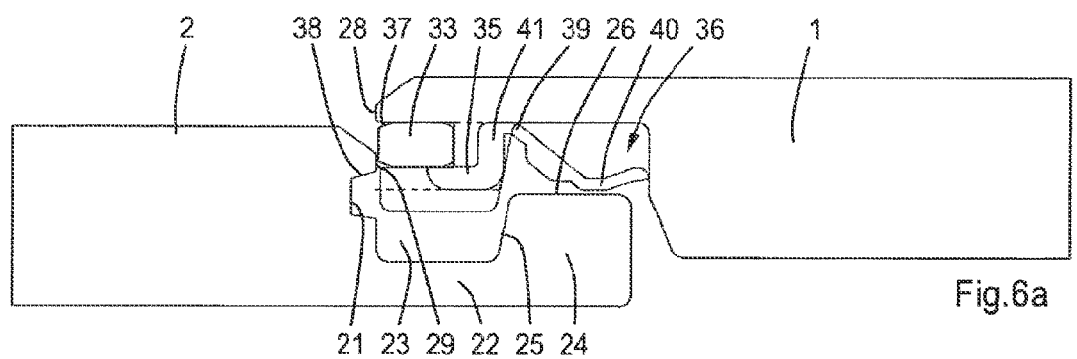
FIGS. 6a, 6b, 6c are views corresponding to those of FIGS. 4a, 4b, 4c but showing the second embodiment of the invention.
Figure 6B:
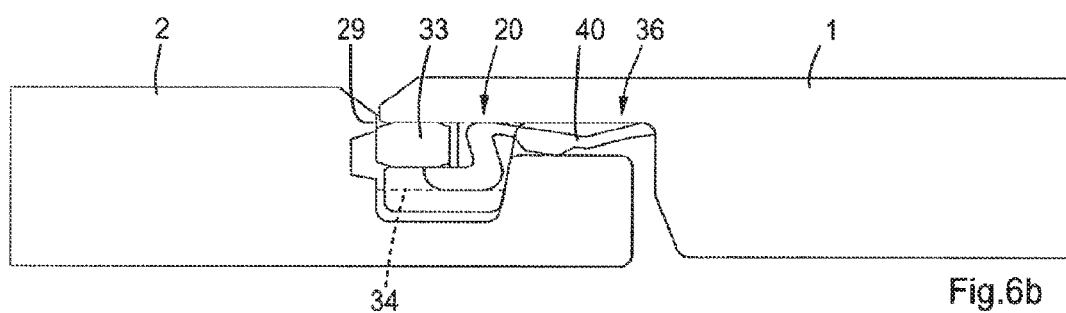
Figure 6C:
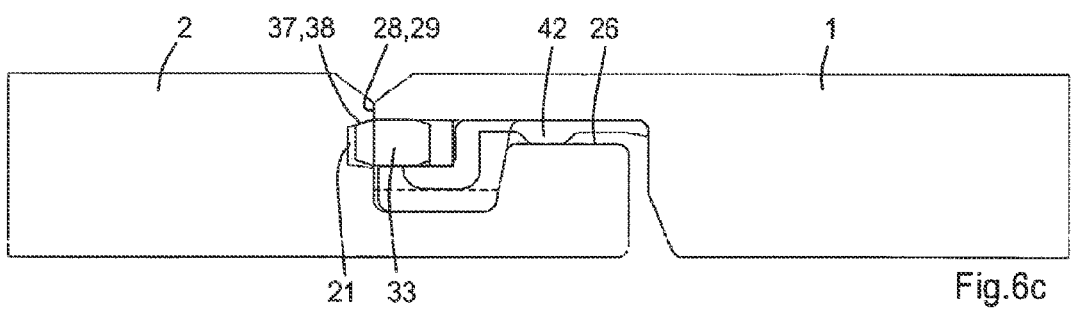

FIGS. 5, 6 and 10 show a second embodiment of the floor panel assembly, especially of the control portion 36 of the locking element 20 thereof. The control portion 36 in this second embodiment is shaped such that the free end of the control portion 36 is at a distance from the top of the recess 31 in the first panel 1 so that this free end may be moved up and down under influence of the upper surface 26 of the projection 24 on the lip 22 of the second joining member 12. Also in this case the control portion 36 has a curved shape in the first position of the locking element 20, and has a more stretched or flat shape in the second position of the locking element. The upright wall of the recess 31 in the first joining member 11 guides the free end of the control portion 36 and forces the hinge 39 to move towards the groove 32. Again the connecting portion 35 acts as a spring urging the tongue 33 into the groove 21 when it arrives at the level of the groove 21 such that the locking surfaces 37, 38 may engage.

Figure 8A:
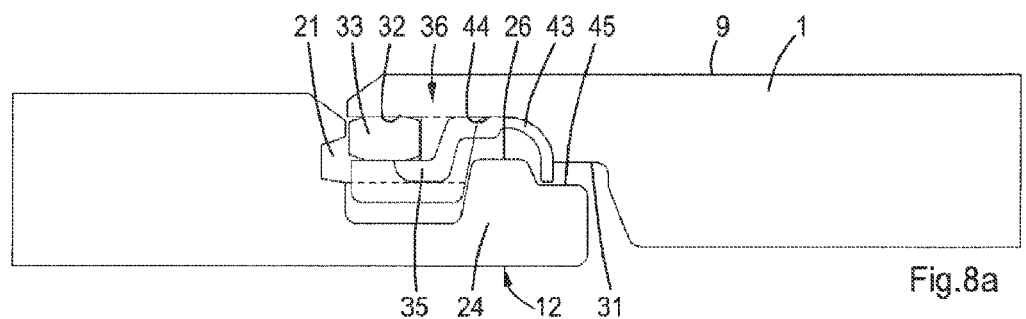
FIGS. 8a, 8b, 8c are views corresponding to those of FIGS. 4a, 4b, 4c but showing the third embodiment of the invention.
Figure 8B:
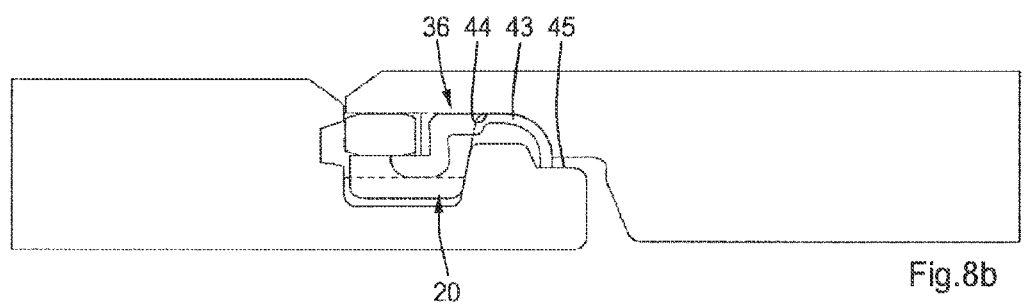
Figure 8C:
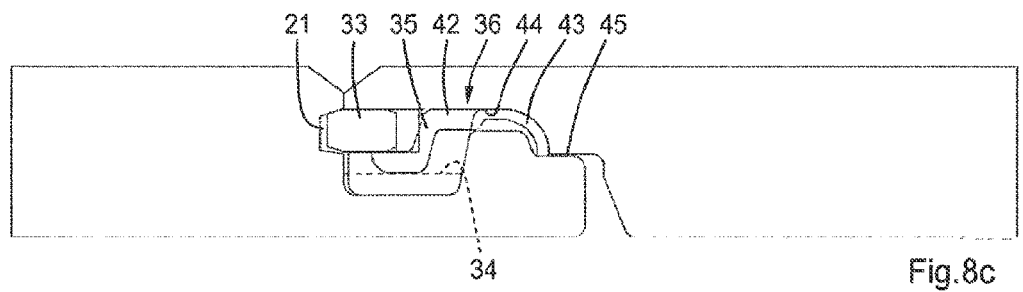

In the third embodiment of FIGS. 7, 8 and 11, the control portion 36 has another configuration such that it has a flexible portion 44 extending along a curved guide 44 in the recess 31 so that the free end of the control portion 36 is at an angle to the tongue 33 and groove 32 and has at least a component perpendicular to the upper surface 9 of the respective panel, and in this embodiment is perpendicular to the upper surface 9. A lowered portion 45 of the upper surface 26 of the projection 24 of the second joining member 12 can come into engagement with the free end of the control portion 36 and can move it upwardly with respect to the first panel 1. As a result, the curved guide 44 of the first joining member 11 transfers the vertical movement of the free end of the control portion 36 into a horizontal movement of the opposite end of the control portion adjacent to the connecting portion 35. This horizontal movement or movement parallel to the upper surface 9 of the panel 1 moves the tongue 33 directly or through the spring action of the connecting portion 35 into the groove 21 of the second joining member 12.

FIGS. 12 and 13 show the embodiment of FIGS. 3 and 4, wherein however the channel 34 is not formed as a hole through the protrusion 30, but as a groove, which is open to the lower side of the panel 1. Generally, such groove is easier to manufacture than a hole. Because the tongue 33 is sufficiently firmly held in the groove 32, the channel 34 does not have to have a holding function. The operation of this embodiment is the same as that of FIGS. 3 and 4.

FIGS. 14 and 15 are two variations of the embodiment of FIG. 4 in which the wall 25 defining the depression 23 on the distal side and co-operating with the downward depression 30 of the mail joining member 11 is formed differently. This is done to enable a disconnection of the joining members 11 and 12 of the panels 1 and 2 by angling the panel 1 upwardly. In the embodiment of FIG. 4 a disconnection is only possible by sliding panels 1 and 2 relatively along their edges 5, 6. The angle of the wall 25 and the corresponding wall on the protrusion 30 is for example between 50 and 60 degrees, here ca. 57 degrees. In the variation of FIG. 15, a small upper portion 25a of the wall is at an angle of substantially 90 degrees, here ca. 88 degrees to effect a slight resistance against angling out of the male joining member 11. The co-operating wall of the downward protrusion 30 of the male joining member has a corresponding shape. Of course this disconnection feature could be combined with all embodiments.

Figure 17A:
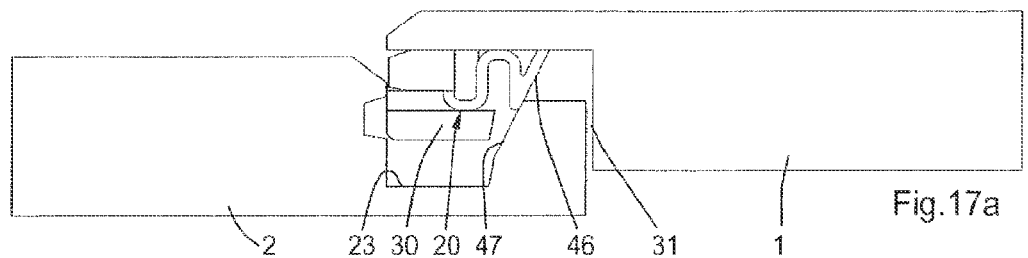
Figure 17B:
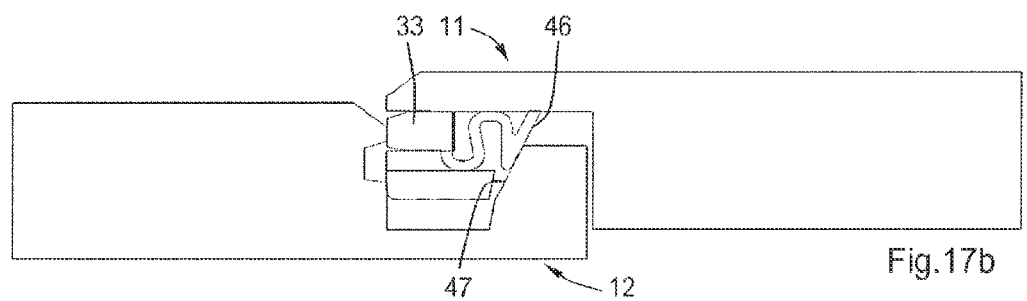
Figure 17C:
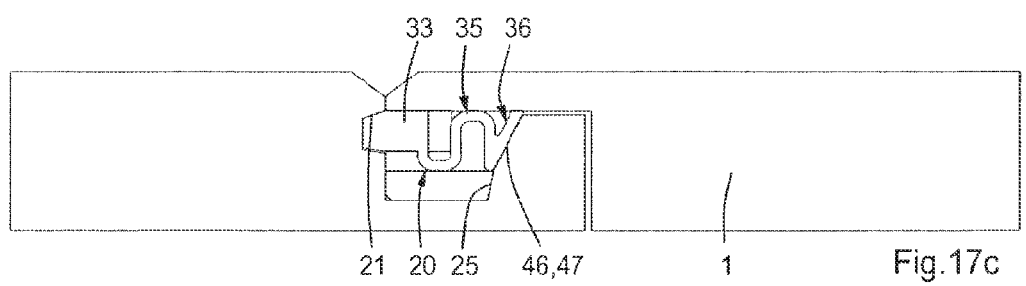

FIG. 16 and 17 illustrate a further embodiment of the invention. In this embodiment, the control portion 36 of the locking element 20 has a control surface 46 that is inclined with respect to the direction of movement of the tongue 33 and with respect to the direction of movement of the panel edges 5, 6 during joining, such that it can co-operate with an also inclined control surface 47 of the female joining member 12 (in this case it is formed by a part of the upright wall 25) to move the tongue 33 of the locking element 20 from the first to the second position. Again the spring 41 of the connecting portion 35 takes up the displacement before it is transferred to the tongue 33 as soon as it has arrived in front of the groove 21. Of course it would be sufficient if only one of the surfaces 46, 47 is inclined to be able to move the tongue 33.

It is noted that aspects of the various embodiments as shown and described may be used in different combinations. The invention is not limited to the embodiments shown in the drawing and described above, which may be varied in different ways within the scope of the invention. For example, it would be possible to provide the locking element in the second or female joining member. This would be more or less the upside down version of the embodiments shown in the drawings. The locking element may also be substantially rigid, while other parts of the panels may be deformable or the locking element and the joining members may have a shape allowing a gradual movement of the locking element. For example an upper entry wall of the groove on the other panel receiving the tongue may be inclined to directly take up the tongue as soon as it is moved by the control portion. Furthermore, it is conceivable to use the invention with panels that have vertical joining members on ail four sides and that can thus be laid by moving the panels vertically with respect to one, two or more panels already installed. Although the locking element has been described before as an element that is separate from the panels, it could be integrated in one of the panels, especially if the panels are made from plastic material. It is also possible that each of the first and second joining members has its own locking element co-operating with the other one. The tongue of the locking elements may be more or less pin shaped such chat the tongue and the control element have substantially the same width and thus each tongue has only a single control element. The panels may have a different configuration than substantially rectangular, in particular triangular or hexagonal. The panel edges should be configured such that adjacent panel edges have matching joining member.

The invention claimed is:

1. A floor panel assembly comprising:
   sheet-shaped floor panels having edges, a lower side and an upper side, each floor panel being provided on at least a first edge with a first joining member and, on a second edge, with a second joining member, the first and second joining members of two adjacent panels configured to be joined by a movement of the two adjacent panels with their first and second edges towards each other such that in a joined position the two adjacent panels meet each other near their upper side along a scam, the first and second joining members locking the two adjacent panels at adjacent first and second edges at least in a direction perpendicular to the upper side and in a direction parallel to the upper side but perpendicular to the adjacent first and second edges in their joined position; and
   at least one locking element which is provided on one of the first and second joining members and comprises a first locking surface co-operating with a second locking surface on the other of said first and second joining members, wherein the locking surface of the locking element is movable from a first position allowing the first and second joining members to be joined, to a second position in which the locking surface locks the first and second joining members to each other, said locking clement having a locking portion on one end bearing said first locking surface and a control portion near a second end as well as a connecting portion between the locking portion and the control portion, said connecting portion being slidably accommodated in a channel and is pushed towards a first end of the channel when the locking surface is moved from the first to the second position by a movement of the control portion extending from an opposite end of the channel for co- operation with the other of said first and second joining members wherein the first and second joining members arc configured as a male and female joining member, the locking element being connected to the male joining member.

2. The floor panel assembly of claim 1, wherein the control portion of the locking clement has a control surface, such that the control surface of the control portion co-operates with a control surface of the other of said first and second joining members, at least one of the control surfaces being inclined with respect to a direction of movement of the locking portion and with respect to a direction of movement of the panel edges to move the locking portion and the locking surface of the locking clement from the first to the second position.

3. The floor panel assembly of claim 1, wherein the male joining member is provided with a protrusion extending away from the upper side of the panel, the channel extending through said protrusion.

4. The floor panel assembly of claim 1, wherein the female joining member comprises a control portion for cooperation with the control portion of the locking clement to move the locking clement when the panel edges move towards each other.

5. The floor panel assembly of claim 4, wherein the female joining member comprises a lip protruding substantially parallel to and from the lower side of the panel at the first edge, said lip having a depression to accommodate the protrusion of the male joining member, said depression having an upright projection near a free end of the lip forming the control portion of the female joining member.

6. The floor panel assembly of claim 1 wherein the locking portion of the locking element extends at least along a part of a length of the respective panel edge and is accommodated in a groove extending along the length of the panel edge, the locking element having a plurality of connecting portions connected to the locking portion, each connecting portion disposed in a channel, the locking element further having a control portion connected to each connecting portion opposite the locking portion.

7. The floor panel assembly of claim 1, wherein the connecting portion of the locking element includes a spring to absorb the movement of the control portion and to cause movement of the locking portion when the first and second locking surfaces are allowed to engage.

8. The floor panel assembly of claim 1, wherein the first and second locking surfaces are inclined with respect to the upper surfaces of the adjacent panels when connected.

9. The floor panel assembly of claim 1, wherein the male joining member is provided with a protrusion extending away from the upper side of the panel, the channel extending through said protrusion and substantially parallel to the upper side of the respective panel.

10. The floor panel assembly of claim 2, wherein the control surface of at least the control portion is inclined with respect to a direction of movement of the locking portion.

11. The floor panel assembly of claim 10, wherein the control surface of the other of said first and second joining members is inclined with respect to a direction of movement of the locking portion.

12. The floor panel assembly of claim 1, wherein the locking portion of the locking element is a tongue slidingly accommodated in a groove extending parallel to the respective edge, the channel having a height greater than that of the groove.

13. The floor panel assembly of claim 12, wherein the channel is a slit opening to the lower side of the panel.

14. The floor panel assembly of claim 1, wherein the other of said first and second joining members comprises a control portion for cooperation with the control portion of the locking element to move the locking element when the panel edges move towards each other.

15. A floor panel configured to be fixed to a second floor panel along edges thereof, the floor panel comprising:
   a lower side;
   an upper side;
   first joining member on a first edge that joins the lower side to the upper side;
   a second joining member on a second edge opposite the first edge wherein the second edge connects the lower side and upper side, the first and second joining members being complimentary configured such that when two adjacent panels are joined by a movement of the two adjacent panels with their first and second edges towards each other the two adjacent panels meet each other near their upper side along a seam in a joined position, the first and second joining members being configured so as to lock the two adjacent panels at adjacent first and second edges at least in a direction perpendicular to the upper side and in a direction parallel to the upper side but perpendicular to the adjacent first and second edges in the joined position, wherein the first joining member includes a channel extending from the first edge to a recess opening to a lower surface of the panel, the recess having an upper recess surface facing in a direction of the lower side and an end recess surface facing in a direction of the first edge; and wherein the second joining member includes a projection configured to extend into the recess when the adjacent panels are in the joined position.

* * * * *

UNITED STATES PATENT AND TRADEMARK OFFICE
CERTIFICATE OF CORRECTION

| | | |
|---|---|---|
| PATENT NO. | : 8,997,430 B1 | Page 1 of 1 |
| APPLICATION NO. | : 14/591448 | |
| DATED | : April 7, 2015 | |
| INVENTOR(S) | : Vermeulen et al. | |

It is certified that error appears in the above-identified patent and that said Letters Patent is hereby corrected as shown below:

On the Title page, item (57) (ABSTRACT), line 2, "looking" should be --locking--.

In the Claims:

At column 10, claim 1, line 19, "scam" should be --seam--.

At column 10, claim 1, line 34, "clement" should be --element--.

At column 10, claim 1, line 44, "arc" should be --are--.

At column 10, claim 2, line 49, "clement" should be --element--.

At column 10, claim 2, line 56, "clement" should be --element--.

At column 10, claim 4, line 63, "clement" should be --element--.

At column 10, claim 4, line 64, "clement" should be --element--.

At column 11, claim 6, line 7, "clement" should be --element--.

At column 11, claim 6, line 10, "clement" should be --element--.

At column 11, claim 6, line 12, "clement" should be --element--.

At column 11, claim 7, line 19, "arc" should be --are--.

Signed and Sealed this
Twenty-seventh Day of October, 2015

Michelle K. Lee
*Director of the United States Patent and Trademark Office*